US012707279B2

(12) United States Patent
Fan et al.

(10) Patent No.: US 12,707,279 B2
(45) Date of Patent: Aug. 11, 2026

(54) UPLINK DATA TRANSMISSION METHOD AND APPARATUS

(71) Applicant: Huawei Technologies Co., Ltd., Shenzhen (CN)

(72) Inventors: Bo Fan, Chengdu (CN); Xi Zhang, Chengdu (CN); Peng Guan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1182 days.

(21) Appl. No.: 17/698,727

(22) Filed: Mar. 18, 2022

(65) Prior Publication Data

US 2022/0210667 A1 Jun. 30, 2022

Related U.S. Application Data

(63) Continuation of application No. PCT/CN2020/113065, filed on Sep. 2, 2020.

(30) Foreign Application Priority Data

Sep. 20, 2019 (CN) ........................ 201910895115.4

(51) Int. Cl.
*H04W 16/28* (2009.01)
*H04B 7/0456* (2017.01)
(Continued)

(52) U.S. Cl.
CPC .......... *H04W 16/28* (2013.01); *H04B 7/0478* (2013.01); *H04L 5/0051* (2013.01);
(Continued)

(58) Field of Classification Search
None
See application file for complete search history.

(56) References Cited

U.S. PATENT DOCUMENTS

2010/0172291 A1* 7/2010 Kim ...................... H04W 48/20 370/328
2019/0281588 A1 9/2019 Zhang et al.
(Continued)

FOREIGN PATENT DOCUMENTS

CN 108366423 A 8/2018
CN 109803414 A 5/2019
(Continued)

OTHER PUBLICATIONS

Author Unknown, Full Tx Power UL transmission, Doc. No. R1-1906226, pp. 1-9, (Year: May 17, 2019).*
(Continued)

*Primary Examiner* — Christopher M Crutchfield
(74) *Attorney, Agent, or Firm* — Leydig, Voit & Mayer, Ltd.

(57) ABSTRACT

An uplink data transmission method and an apparatus are provided. The method includes: A network device sends configuration information to a terminal device, wherein the configuration information is used to configure N SRS resources; the network device sends downlink control information to the terminal device, wherein an SRI field and a TPMI field in the downlink control information jointly indicate M SRS resources in the N SRS resources; and the terminal device sends uplink data by using the M SRS resources. M is an integer greater than or equal to 1. When M is greater than 1, multi-beam uplink transmission of the terminal device can be implemented, and coverage and a capacity of uplink transmission can be improved.

17 Claims, 6 Drawing Sheets

(51) Int. Cl.
*H04L 5/00* (2006.01)
*H04W 72/044* (2023.01)
*H04W 72/23* (2023.01)
*H04W 72/563* (2023.01)

(52) U.S. Cl.
CPC ......... *H04W 72/046* (2013.01); *H04W 72/23* (2023.01); *H04W 72/563* (2023.01)

(56) References Cited

U.S. PATENT DOCUMENTS

| | | | | |
|---|---|---|---|---|
| 2021/0050890 A1* | 2/2021 | Park | ..................... | H04B 7/0626 |
| 2022/0109474 A1* | 4/2022 | Haghighat | ........... | H04B 7/0465 |
| 2024/0291692 A1* | 8/2024 | Huang | ................ | H04L 25/0226 |

FOREIGN PATENT DOCUMENTS

| | | |
|---|---|---|
| CN | 110034886 A | 7/2019 |
| WO | 2019074289 A1 | 4/2019 |

OTHER PUBLICATIONS

Author Unknown, Full Tx Power UL transmission, Doc. No. R1-1907184, pp. 1-31, (Year: May 17, 2019).*

Author Unknown, Remaining issues on UL MIMO full power transmission with multiple PAs, Doc. No. R1-1908068, pp. 1-16, (Year: May 17, 2019).*

"Discussion on SRS for configured grant PUSCH," 3GPP TSG RAN WG1 #96bis, R1-1904753, Xi'an, China, pp. 1-3, 3rd Generation Partnership Project, Valbonne, France (Apr. 8-12, 2019).

"Chairman's notes of AI 7.1.2 Maintenance for MIMO," 3GPP TSG RAN WG1 Meeting #94bis, R1-1811982, Chengdu, China, Total 23 pages, 3rd Generation Partnership Project, Valbonne, France (Oct. 8-12, 2018).

"3rd Generation Partnership Project; Technical Specification Group Radio Access Network; NR; Radio Resource Control (RRC) protocol specification (Release 15)," 3GPP TS 38.331 V15.5.0, pp. 1-491, 3rd Generation Partnership Project, Valbonne, France (Mar. 2019).

"3rd Generation Partnership Project; Technical Specification Group Radio Access Network; NR; Physical layer procedures for data (Release 15)," 3GPP TS 38.214 V15.5.0, pp. 1-103, 3rd Generation Partnership Project, Valbonne, France (Mar. 2019).

"3rd Generation Partnership Project; Technical Specification Group Radio Access Network; NR; Physical channels and modulation (Release 15)," 3GPP TS 38.211 V15.5.0, pp. 1-96, 3rd Generation Partnership Project, Valbonne, France (Mar. 2019).

"3rd Generation Partnership Project; Technical Specification Group Radio Access Network; NR; Multiplexing and channel coding (Release 15)," 3GPP TS 38.212 V15.5.0, pp. 1-101, 3rd Generation Partnership Project, Valbonne, France (Mar. 2019).

"3rd Generation Partnership Project; Technical Specification Group Radio Access Network; NR; Physical layer procedures for control (Release 15)," 3GPP TS 38.213 V15.5.0, pp. 1-104, 3rd Generation Partnership Project, Valbonne, France (Mar. 2019).

"Maintenance for codebook and non-codebook based UL transmission," 3GPP TSG RAN WG1 Meeting #94, Goteborg, Sweden, R1-1808549, Total 6 pages, 3rd Generation Partnership Project, Valbonne, France (Aug. 20-24, 2018).

* cited by examiner

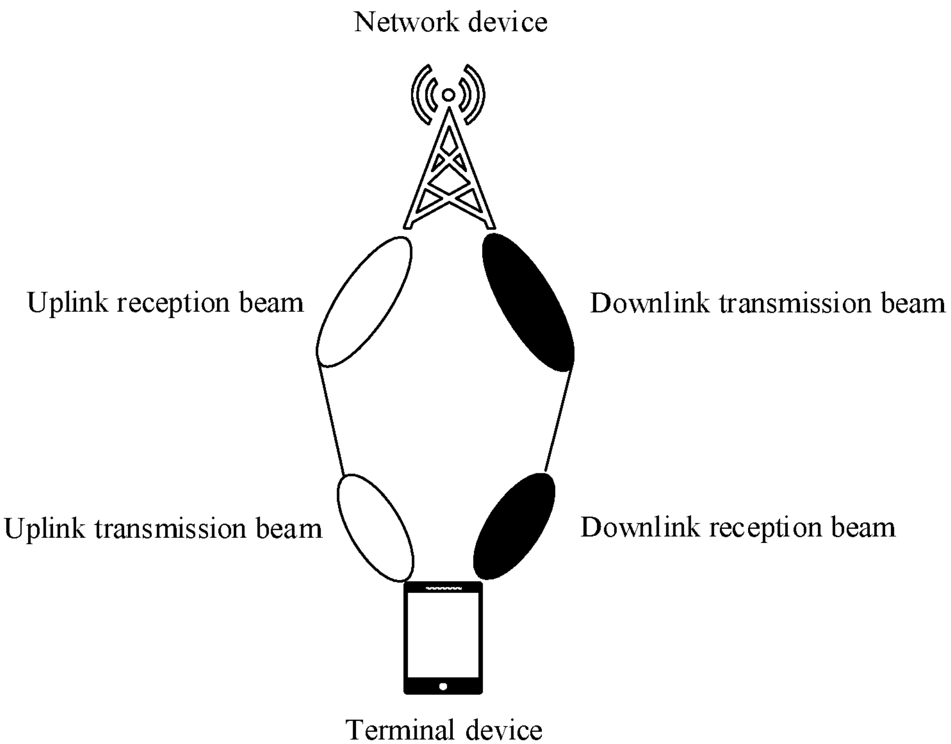
FIG. 3
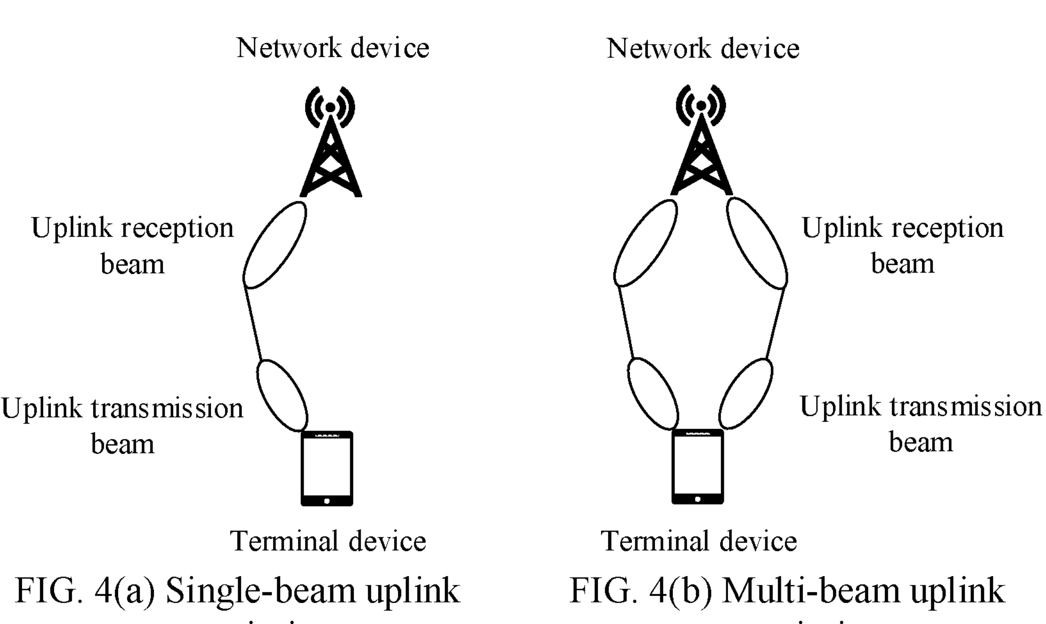
FIG. 4(a) Single-beam uplink transmission
FIG. 4(b) Multi-beam uplink transmission

UPLINK DATA TRANSMISSION METHOD AND APPARATUS

CROSS-REFERENCE TO RELATED APPLICATIONS

This application is a continuation of International Application No. PCT/CN2020/113065, filed on Sep. 2, 2020, which claims priority to Chinese Patent Application No. 201910895115.4, filed on Sep. 20, 2019. The disclosures of the aforementioned applications are hereby incorporated by reference in their entireties.

TECHNICAL FIELD

Embodiments of this application relate to the field of wireless communication technologies, and in particular, to an uplink data transmission method and an apparatus.

BACKGROUND

In a fifth-generation mobile communication system, high frequency communication is usually used. The high frequency communication means that data transmission is performed by using a high frequency band. For example, an ultra-high frequency band with a frequency greater than 6 GHz is used for data transmission. The high-frequency communication has the following problem: Energy of a signal sharply decreases with a transmission distance. Consequently, the transmission distance of the signal is short. To overcome the problem, the following solution is proposed: High frequency signals are processed by using a large-scale antenna array, and the high frequency signals are concentrated in a small range, to form a signal similar to a light beam, thereby increasing a transmission distance of the high frequency signals. The signal similar to a light beam may be referred to as an analog beam or a beam. How a terminal device performs uplink data transmission by using a beam is a current research hotspot.

SUMMARY

According to a first aspect, an uplink data transmission method is provided. The method includes: A terminal device receives configuration information from a network device, where the configuration information includes a sounding reference signal (SRS) resource set, the SRS resource set includes N SRS resources, and N is an integer greater than 0; the terminal device receives downlink control information from the network device and jointly determines, by using a spatial rank index (SRI) field and a transmitted precoding matrix indicator (TPMI) field in the downlink control information, M SRS resources used for uplink data transmission, where M is an integer greater than or equal to 1 and less than or equal to N; and the terminal device sends uplink data by using the M SRS resources. Optionally, a value of a usage parameter of the SRS resource set is configured as a codebook.

In this design, one SRS resource corresponds to one beam. That the terminal device sends uplink data by using the M SRS resources means that the terminal device sends the uplink data by using M beams corresponding to the M SRS resources. In this case, a quantity of antenna ports of a precoding matrix for uplink transmission is equal to a sum of quantities of antenna ports of the M SRS resources. That a value of M is 1 corresponds to single-beam uplink transmission. That the value of M is greater than 1 corresponds to multi-beam uplink transmission. A capacity and coverage of uplink transmission can be improved by using the multi-beam uplink transmission.

In a possible design, the jointly determining, by using an SRI field and a TPMI field in the downlink control information, M SRS resources used for uplink data transmission includes: If a quantity of antenna ports corresponding to a precoding matrix indicated by the TPMI field is equal to a sum of quantities of antenna ports of the N SRS resources, the terminal device determines that M is equal to N, and the M SRS resources used to send the uplink data are the N SRS resources.

In a possible design, the method further includes: When the quantity of antenna ports of the precoding matrix indicated by the TPMI field is equal to the sum of the quantities of antenna ports of the N SRS resources, the terminal device determines that there is no SRI field in the downlink control information, or a length of the SRI field is 0.

In a possible design, the jointly determining, by using an SRI field and a TPMI field in the downlink control information, M SRS resources used for uplink data transmission includes: If a quantity of antenna ports corresponding to a precoding matrix indicated by the TPMI field is less than a sum of quantities of antenna ports of the N SRS resources, the terminal device determines that M is less than N and determines the M SRS resources by using the SRI

FIELD

In a possible design, the determining the M SRS resources by using the SRI field includes: The terminal device determines, in SRS resources whose quantities of antenna ports are equal to the quantity of antenna ports of the precoding matrix indicated by the TPMI field and based on a value of the SRI field, the M SRS resources used for uplink data transmission.

According to a second aspect, an uplink data transmission method is provided. The method includes: A network device sends configuration information to a terminal device, where the configuration information includes a sounding reference signal (SRS) resource set, the SRS resource set includes N SRS resources, and N is an integer greater than 0; the network device sends downlink control information to the terminal device, where a spatial rank index (SRI) field and a transmitted precoding matrix indicator (TPMI) field in the downlink control information are used to jointly determine M SRS resources used for uplink data transmission, and M is an integer greater than or equal to 1 and less than or equal to N; and the network device receives uplink data that is sent by the terminal device by using the M SRS resources. Optionally, a value of a usage parameter of the SRS resource set is configured as a codebook.

In this design, when time domain resources corresponding to the N SRS resources in the SRS resource set all overlap with each other, and reference signal resources in spatial relation information parameters of the N SRS resources are all different, the terminal device may send the uplink data by using the N SRS resources. When a value of N is 1, the terminal device may perform uplink data transmission by using a single beam. When the value of N is greater than 1, the terminal device may perform uplink data transmission by using a plurality of beams. A capacity and coverage of uplink transmission can be improved by using multi-beam uplink data transmission.

In a possible design, that the SRI field and the TPMI field in the downlink control information are used to jointly determine the M SRS resources used for uplink data transmission includes: If a quantity of antenna ports of a precoding matrix indicated by the TPMI field is equal to a sum of quantities of antenna ports of the N SRS resources, M is equal to N, and the M SRS resources used to send the uplink data are the N SRS resources.

In a possible design, when the quantity of antenna ports of the precoding matrix indicated by the TPMI field is equal to the sum of the quantities of antenna ports of the N SRS resources, there is no SRI field in the downlink control information, or a length of the SRI field is 0.

In a possible design, that the SRI field and the TPMI field in the downlink control information are used to jointly determine the M SRS resources used for uplink data transmission includes: If a quantity of antenna ports of a precoding matrix indicated by the TPMI field is less than a sum of quantities of antenna ports of the N SRS resources, M is less than N, and the M SRS resources are determined by using the SRI field.

According to a third aspect, an uplink data transmission method is provided. The method includes: A terminal device receives configuration information from a network device, where the configuration information includes a sounding reference signal (SRS) resource set, the SRS resource set includes N SRS resources, and N is an integer greater than 0; and when the configuration information meets a first condition, the terminal device sends uplink data by using the N SRS resources. Optionally, a value of a usage parameter of the SRS resource set is configured as a codebook.

In this design, the network device may indicate the terminal device to perform uplink data transmission by using beams corresponding to a plurality of SRS resources, to implement multi-beam uplink data transmission and improve a capacity and coverage of uplink transmission.

In a possible design, the first condition includes one of or a combination of a plurality of the following: In the N SRS resources, time domain resources of all the SRS resources overlap with each other; in the N SRS resources, time domain resources of at least two SRS resources overlap with each other; in the N SRS resources, reference signal resources in spatial relation information parameters of all the SRS resources are different; in the N SRS resources, reference signal resources in spatial relation information parameters of at least two SRS resources are different; or a value of N is greater than a preset value.

According to a fourth aspect, an uplink data transmission method is provided. The method includes: A network device sends configuration information to a terminal device, where the configuration information includes a sounding reference signal (SRS) resource set, the SRS resource set includes N SRS resources, and N is an integer greater than 0. The network device receives the uplink data that is sent by the terminal device by using the N SRS resources when the first condition is met. Optionally, a value of a usage parameter of the SRS resource set is configured as a codebook.

In a possible design, the first condition includes one of or a combination of a plurality of the following: In the N SRS resources, time domain resources of all the SRS resources overlap with each other; in the N SRS resources, time domain resources of at least two SRS resources overlap with each other; in the N SRS resources, reference signal resources in spatial relation information parameters of all the SRS resources are different; in the N SRS resources, reference signal resources in spatial relation information parameters of at least two SRS resources are different; or a value of N is greater than a preset value.

According to a fifth aspect, an uplink data transmission method is provided. The method includes: A terminal device receives configuration information from a network device, where the configuration information includes a sounding reference signal (SRS) resource set, the SRS resource set includes N SRS resources, the SRS resource set is associated with one or more channel state information reference signal (CSI-RS) resources, and N is an integer greater than 0; and the terminal device determines a spatial reception parameter of the one or more CSI-RS resources based on spatial relation information of the N SRS resources. Optionally, a value of a usage parameter of the SRS resource set is configured as a noncodebook.

In a possible design, the determining a spatial reception parameter of the one or more CSI-RS resources based on spatial relation information of the N SRS resources includes: using all different spatial relation information in the spatial relation information corresponding to the N SRS resources as the spatial reception parameter of the one or more CSI-RS resources; using spatial relation information of an SRS resource having a smallest or largest resource index in the N SRS resources as the spatial reception parameter of the one or more CSI-RS resources; or using spatial relation information of an SRS resource having a smallest or largest resource index in SRS resources for which spatial relation information is configured in the N SRS resources as the spatial reception parameter of the one or more CSI-RS resources.

In a possible design, the spatial reception parameter of the one or more CSI-RS resources is determined based on the spatial relation information of the N SRS resources when one or more of the following conditions are met: A transmission configuration indication state is not configured in the CSI-RS resource; a transmission configuration indication state configured in the CSI-RS resource does not include information whose type is a type D; spatial relation information is configured for at least one of the N SRS resources; spatial relation information is configured for each of the N SRS resources; the spatial relation information corresponding to the N SRS resources is the same; the spatial relation information corresponding to the N SRS resources is not exactly the same; the spatial relation information corresponding to the N SRS resources is completely different; or a value of a first field in the SRS resource set is configured as a preset value.

In a possible design, the first field is used to indicate whether the spatial reception parameter of the one or more CSI-RS resources is determined by using the spatial relation information of the N SRS resources.

According to a sixth aspect, an uplink data transmission method is provided. The method includes: A network device sends configuration information to a terminal device, where the configuration information includes a sounding reference signal (SRS) resource set, the SRS resource set includes N SRS resources, the SRS resource set is associated with one or more channel state information reference signal (CSI-RS) resources, N is an integer greater than 0, and spatial relation information of the N SRS resources is used to determine a spatial reception parameter of the one or more CSI-RS resources. Optionally, a value of a usage parameter of the SRS resource set is configured as a noncodebook.

In a possible design, a process that spatial relation information of the N SRS resources is used to determine a spatial reception parameter of the one or more CSI-RS resources may include: using all different spatial relation information in the spatial relation information corresponding to the N SRS resources as the spatial reception parameter of the one or more CSI-RS resources; using spatial relation information of an SRS resource having a smallest or largest resource index in the N SRS resources as the spatial reception parameter of the one or more CSI-RS resources; or using spatial relation information of an SRS resource having a smallest or largest resource index in SRS resources for which spatial relation information is configured in the N SRS resources as the spatial reception parameter of the one or more CSI-RS resources.

In a possible design, the spatial reception parameter of the one or more CSI-RS resources is determined by using the spatial relation information of the N SRS resources when one or more of the following conditions are met: A transmission configuration indication state is not configured in the CSI-RS resource; a transmission configuration indication state configured in the CSI-RS resource does not include information whose type is a type D; spatial relation information is configured for at least one of the N SRS resources; spatial relation information is configured for each of the N SRS resources; the spatial relation information corresponding to the N SRS resources is the same; the spatial relation information corresponding to the N SRS resources is not exactly the same; the spatial relation information corresponding to the N SRS resources is completely different; or a value of a first field in the SRS resource set is configured as a preset value.

In a possible design, the first field is used to indicate whether the spatial reception parameter of the one or more CSI-RS resources is determined by using the spatial relation information of the N SRS resources.

According to a seventh aspect, a communication apparatus is provided. The communication apparatus includes: a communication unit, configured to receive configuration information from a network device, where the configuration information includes a sounding reference signal (SRS) resource set, the SRS resource set includes N SRS resources, and N is an integer greater than 0; and the communication unit is further configured to receive downlink control information from the network device; and a processing unit, configured to jointly determine, by using a spatial rank index (SRI) field and a transmitted precoding matrix indicator (TPMI) field in the downlink control information, M SRS resources used for uplink data transmission, where M is an integer greater than or equal to 1 and less than or equal to N; and the processing unit is further configured to send uplink data by using the M SRS resources. Optionally, a value of a usage parameter of the SRS resource set is configured as a codebook.

For specific execution processes of the communication unit and the processing unit, refer to descriptions in the first aspect. Details are not provided herein again.

According to an eighth aspect, a communication apparatus is provided. The communication apparatus includes: a memory, configured to store a program instruction; a processor, configured to determine M SRS resources for uplink data transmission by using an SRI field and a TPMI field in DCI; and a communication interface, configured to receive configuration information and downlink control information that are sent by a network device and send uplink data by using M SRS resources.

For specific execution processes of the processor and the communication interface, refer to descriptions in the first aspect. Details are not provided herein again.

According to a ninth aspect, a communication apparatus is provided. The communication apparatus includes: a communication unit, configured to send configuration information to a terminal device, where the configuration information includes a sounding reference signal (SRS) resource set, the SRS resource set includes N SRS resources, and N is an integer greater than 0; the communication unit is further configured to send downlink control information to the terminal device, a spatial rank index (SRI) field and a transmitted precoding matrix indicator (TPMI) field in the downlink control information are used to jointly determine M SRS resources used for uplink data transmission, and M is an integer greater than or equal to 1 and less than or equal to N; and the communication unit is further configured to receive uplink data that is sent by the terminal device by using the M SRS resources. Optionally, a value of a usage parameter of the SRS resource set is configured as a codebook.

For specific execution processes of the communication unit and the processing unit, refer to descriptions in the second aspect. Details are not provided herein again.

According to a tenth aspect, a communication apparatus is provided. The communication apparatus includes: a memory, configured to store a program instruction; a communication interface, configured to receive configuration information, downlink control information, and uplink data that are sent by a terminal device; and a processor, configured to process the uplink data.

For specific execution processes of the processor and the communication interface, refer to descriptions in the second aspect. Details are not provided herein again.

According to an eleventh aspect, a communication apparatus is provided. The communication apparatus includes: a communication unit, configured to receive configuration information sent by a network device; and a processing unit, configured to, when the configuration information meets a first condition, control the communication unit to send uplink data by using N SRS resources.

For specific execution processes of the communication unit and the processing unit, refer to descriptions in the third aspect. Details are not provided herein again.

According to a twelfth aspect, a communication apparatus is provided. The communication apparatus includes a memory, configured to store a program instruction; a communication interface, configured to receive configuration information sent by a terminal device; and a processor, configured to, when the configuration information meets a first condition, control the communication interface to send uplink data by using N SRS resources.

For specific execution processes of the processor and the memory, refer to descriptions in the third aspect. Details are not provided herein again.

According to a thirteenth aspect, a communication apparatus is provided. The communication apparatus includes a communication unit, configured to send configuration information and uplink data to a terminal device; and a processing unit, configured to process the uplink data.

For specific execution processes of the communication unit and the processing unit, refer to descriptions in the fourth aspect. Details are not provided herein again.

According to a fourteenth aspect, a communication apparatus is provided. The communication apparatus includes a memory, configured to store a program instruction; a communication interface, configured to send configuration information and uplink data to a terminal device; and a processor, configured to process the uplink data.

For specific execution processes of the communication interface and the processor, refer to descriptions in the fourth aspect. Details are not provided herein again.

According to a fifteenth aspect, a communication apparatus is provided. The communication apparatus includes: a communication unit, configured to receive configuration information from a network device, where the configuration information includes a sounding reference signal (SRS) resource set, the SRS resource set includes N SRS resources, the SRS resource set is associated with one or more channel state information reference signal (CSI-RS) resources, and N is an integer greater than 0; and a processing unit, configured to determine a spatial reception parameter of the one or more CSI-RS resources based on spatial relation information of the N SRS resources. Optionally, a value of a usage parameter of the SRS resource set is configured as a noncodebook.

For specific execution processes of the communication unit and the processing unit, refer to descriptions in the fifth aspect. Details are not provided herein again.

According to a sixteenth aspect, a communication apparatus is provided. The communication apparatus includes a memory, configured to store a program instruction; a communication interface, configured to receive configuration information from a network device; and a processor, configured to determine a spatial reception parameter of one or more CSI-RS resources based on spatial relation information of N SRS resources. Optionally, a value of a usage parameter of the SRS resource set is configured as a noncodebook.

For specific execution processes of the communication interface and the processor, refer to descriptions in the fifth aspect. Details are not provided herein again.

According to a seventeenth aspect, a communication apparatus is provided. The communication apparatus includes: a communication unit, configured to send configuration information to a terminal device, where the configuration information includes an SRS resource set, the SRS resource set includes N SRS resources, the SRS resource set is associated with one or more CSI-RS resources, and spatial relation information of the N SRS resources is used to determine a spatial reception parameter of the one or more CSI-RS resources. Optionally, a value of a usage parameter of the SRS resource set is configured as a noncodebook.

For specific execution processes of the communication unit and the processing unit, refer to descriptions in the sixth aspect. Details are not provided herein again.

According to an eighteenth aspect, a communication apparatus is provided. The communication apparatus includes a memory, configured to store a program instruction; and a communication interface, configured to send configuration information to a terminal device. The configuration information includes an SRS resource set, the SRS resource set includes N SRS resources, the SRS resource set is associated with one or more CSI-RS resources, and spatial relation information of the N SRS resources is used to determine a spatial reception parameter of the one or more CSI-RS resources. Optionally, a value of a usage parameter of the SRS resource set is configured as a noncodebook.

For specific execution processes of the communication interface and the processor, refer to descriptions in the sixth aspect. Details are not provided herein again.

According to a nineteenth aspect, an embodiment of this application provides a communication apparatus, including a processor, a transceiver, and a memory. The processor is configured to execute a computer program or instructions stored in the memory, and when the computer program or the instructions are executed, the apparatus is enabled to implement the method according to any one of the first aspect to the sixth aspect. The transceiver is configured to perform actions of receiving or sending information according to any one of the first aspect to the sixth aspect.

According to a twentieth aspect, an embodiment of this application provides a communication apparatus, including a processor, where the processor is coupled to at least one memory, the processor is configured to execute a computer program or instructions stored in the at least one memory, and when the computer program or the instructions are executed, the method according to any one of the first aspect to the sixth aspect is performed.

According to a twenty-first aspect, a computer readable storage medium is provided. The computer readable storage medium includes a computer program or instructions. When the computer program or the instructions are run on a computer, the computer is enabled to perform the method according to any one of the first aspect to the sixth aspect.

According to a twenty-second aspect, a chip is provided. The chip includes a processor, where the processor is connected to a memory and is configured to read and execute a computer program or instructions stored in the memory, and when the computer program or the instructions are executed, the method according to any one of the first aspect to the sixth aspect is performed.

According to a twenty-third aspect, a computer program product is provided. The computer program product includes a computer program or instructions. When the computer program or the instructions are run on a computer, the computer is enabled to perform the possible method according to any one of the first aspect to the sixth aspect.

According to a twenty-fourth aspect, a system is provided. The system includes the network device and the terminal device according to any one of the foregoing aspects.

According to a twenty-fifth aspect, a communication apparatus is provided. The communication apparatus includes a processor and an interface, where the processor is coupled to a memory through the interface, and when the processor executes a computer program in the memory, the method according to any one of the first aspect to the sixth aspect is performed.

BRIEF DESCRIPTION OF DRAWINGS

FIG. 3 is a schematic diagram of beam transmission according to an embodiment of this application;

FIG. 4(*a*) and FIG. 4(*b*) are schematic diagrams of beam transmission according to an embodiment of this application;

DESCRIPTION OF EMBODIMENTS

Figures 1, 2:
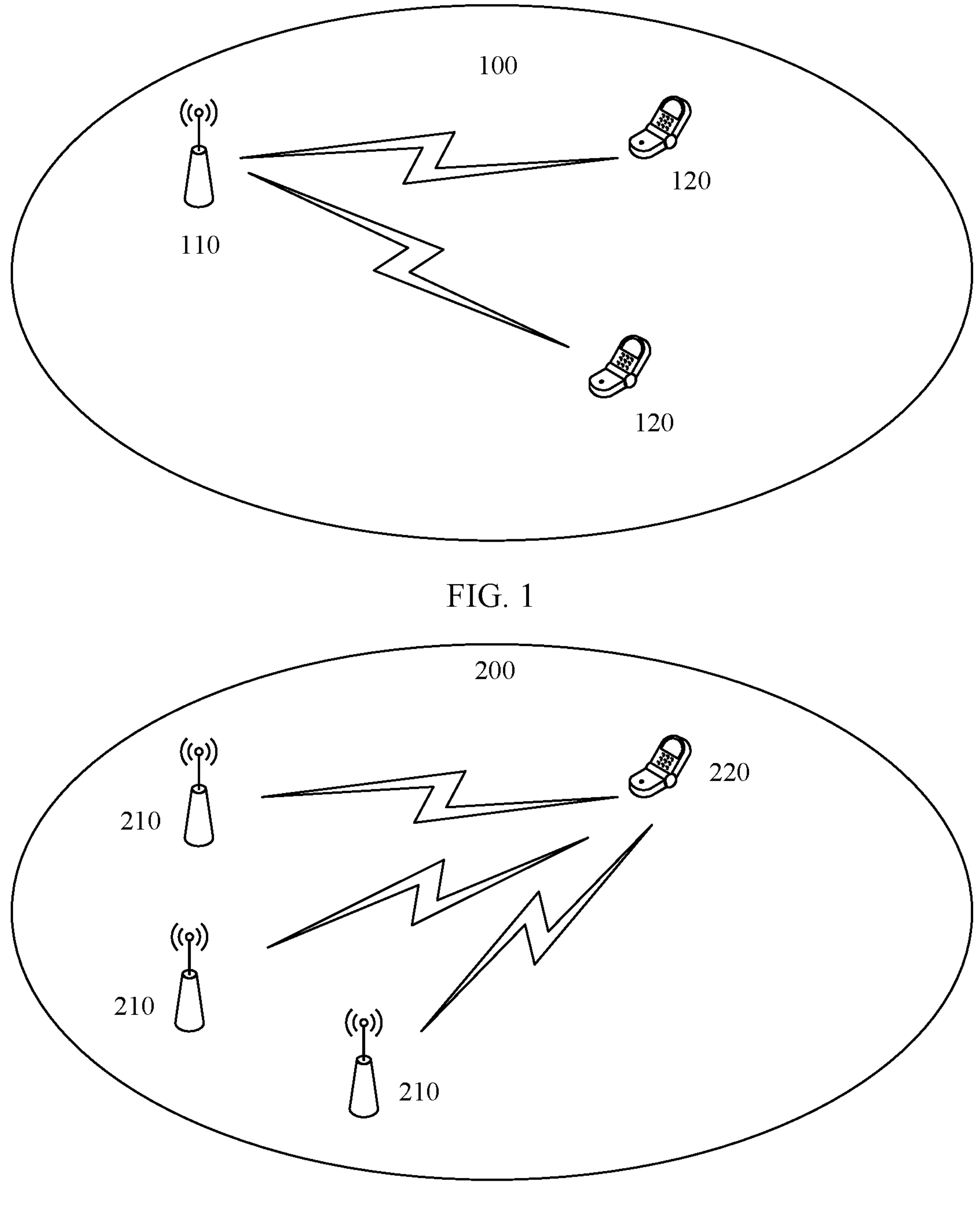
FIG. 1 is a schematic diagram of a communication system to which an embodiment of this application is applicable.
FIG. 2 is a schematic diagram of a communication system to which an embodiment of this application is applicable.

FIG. 1 shows a first communication system 100 to which an embodiment of this application is applied. The communication system 100 includes at least a network device 110 and a terminal device 120. The network device 110 and the terminal device 120 may communicate with each other through a Uu air interface. The Uu air interface may be understood as a universal interface (universal UE to network interface) between the terminal device and the network device. Transmission through the Uu air interface includes uplink transmission and downlink transmission.

Uplink transmission means that the terminal device 120 sends uplink information to the network device 110. The uplink information may include one or more of uplink data information, uplink control information, and an uplink reference signal (RS). A channel for transmitting the uplink information may be referred to as an uplink channel. The uplink channel may be a physical uplink shared channel (PUSCH) or a physical uplink control channel (PUCCH). The PUSCH is used to carry uplink data, and the uplink data may also be referred to as uplink data information. The PUCCH is used to carry uplink control information (UCI) fed back by the terminal device. The UCI may include channel state information (CSI), an acknowledgement (ACK)/a negative acknowledgement (NACK), and the like.

Downlink transmission means that the network device 110 sends downlink information to the terminal device 120. The downlink information may include one or more of downlink data information, downlink control information, and a downlink reference signal. The downlink reference signal may be a channel state information reference signal (CSI-RS) or a phase tracking reference signal (PTRS). A channel for transmitting the downlink information may be referred to as a downlink channel. The downlink channel may be a physical downlink shared channel (PDSCH) or a physical downlink control channel (PDCCH). The PDCCH is used to carry downlink control information (DCI). The PDSCH is used to carry downlink data, and the downlink data may also be referred to as downlink data information.

In the communication system 100 shown in FIG. 1, there may be one network device 110, there may be a plurality of terminal devices 120, and the network device 110 may provide a service to the plurality of terminal devices 120. For example, in uplink transmission, the plurality of terminal devices 120 may send uplink information to the same network device 110. In downlink transmission, the network device 110 may send downlink information to the plurality of terminal devices 120.

FIG. 1 shows an example of one network device and two terminal devices. This is not construed as a limitation on the embodiments of this application. For example, the communication system 100 may include a plurality of network devices, and a coverage of one network device includes one or more terminal devices.

FIG. 2 shows a second communication system 200 to which an embodiment of this application is applied. The communication system 200 includes a network device 210 and a terminal device 220. The network device 210 and the terminal device 220 may communicate with each other through a Uu air interface. Transmission through the Uu air interface includes uplink transmission and downlink transmission. For the uplink transmission and the downlink transmission, refer to descriptions in the communication system 100.

In the communication system 200 shown in FIG. 2, there may be one terminal device 220 and a plurality of network devices 210, and the plurality of network devices 210 all provide services to the terminal device 220. In uplink transmission, the terminal device 220 may send uplink information to the plurality of network devices 210. In downlink transmission, the plurality of network devices 210 may send downlink information to the terminal device 220.

FIG. 2 shows an example of one terminal device and three network devices. This is not construed as a limitation on this application. For example, the communication system 200 may include a plurality of terminal devices. The plurality of terminal devices may be located in a coverage of a same network device or coverages of different network devices.

Based on the communication system shown in FIG. 1 or FIG. 2, an uplink data transmission method is provided. In the method, a network device and a terminal device may communicate based on a beam. The beam may also be referred to as an analog beam, and signals are processed by using a large-scale array, and the signals are concentrated in a small range, to form a signal, namely, a beam, similar to a light beam. A transmission distance of a signal may be increased by sending a signal by using a beam. A specific application of the beam is that in a fifth-generation mobile communication system, high frequency communication is widely used. A major problem of a high frequency signal is that energy of the signal sharply decreases with a transmission distance. Consequently, the transmission distance of the signal is short. However, a problem of a short transmission distance of the high frequency signal can be resolved by sending a signal by using a beam.

The network device and the terminal device both can generate different beams, pointing to different directions. As shown in FIG. 3, in uplink transmission, a terminal device sends uplink information by using an uplink transmission beam. Correspondingly, a network device receives the uplink information by using an uplink reception beam. The uplink transmission beam is aligned with the uplink reception beam. In downlink transmission, the network device sends downlink information by using a downlink transmission beam. Correspondingly, the terminal device receives the downlink information by using a downlink reception beam. The downlink transmission beam is aligned with the downlink reception beam.

In uplink transmission, the uplink transmission beam used by the terminal device is specified by the network device. For example, the network device determines an optimal uplink transmission beam by using a beam management process. One target uplink transmission beam is indicated to the terminal device by using radio resource control (RRC) signaling or downlink control information (DCI) signaling. When there are a plurality of optimal uplink transmission beams determined by the network device, the target uplink transmission beam indicated by using the RRC signaling or the DCI signaling is one of the optimal uplink transmission beams determined by the network device. When there is one optimal uplink transmission beam determined by the network device, the target uplink transmission beam indicated by using the RRC signaling or the DCI signaling is the optimal uplink transmission beam determined by the network device. According to stipulations in a protocol in R15, the network device can only indicate a single uplink transmission beam and cannot indicate a plurality of uplink transmission beams. Consequently, the terminal device can only support uplink transmission based on a single beam (refer to the descriptions of FIG. 4(*a*)), and cannot support uplink transmission based on a plurality of beams (refer to the descriptions of FIG. 4(*b*)). As a result, a capacity and coverage of uplink transmission is limited.

Currently, there are two modes for uplink data transmission, namely, codebook (codebook)-based uplink data transmission and noncodebook-based uplink data transmission. In this application, the two uplink data transmission modes are improved, to support both single-beam uplink transmission and multi-beam uplink transmission, thereby improving a capacity and coverage of uplink transmission. In the embodiments of this application, for codebook-based uplink transmission, refer to descriptions in the processes shown in FIG. 5, FIG. 6, and FIG. 7. For noncodebook-based uplink transmission, refer to descriptions in the processes shown in FIG. 8 and FIG. 9.

The following explains and describes some nouns or terms used in this application, and the nouns or terms are also used as a part of the present invention.

1. Terminal Device

The terminal device may be referred to as a terminal for short, and is a device having a wireless transceiver function. The terminal device may be deployed on land, where the deployment includes indoor or outdoor, or handheld or vehicle-mounted deployment, may be deployed on water (for example, on a ship), or may be deployed in air (for example, on an aircraft, a balloon, or a satellite). The terminal device may be a mobile phone, a tablet computer (pad), a computer having a wireless transceiver function, a virtual reality (VR) terminal device, an augmented reality (AR) terminal device, a wireless terminal device in industrial control, a wireless terminal device in self driving, a wireless terminal device in telemedicine (remote medical), a wireless terminal device in a smart grid, a wireless terminal device in transportation safety, a wireless terminal device in a smart city, or a wireless terminal device in a smart home, and may further include user equipment (UE) and the like. Alternatively, the terminal device may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5th generation (5G) network, a terminal device in a future evolved public land mobile network (PLMN), or the like. The terminal device sometimes may also be referred to as a terminal, an access terminal device, a vehicle-mounted terminal device, an industrial control terminal device, a UE unit, a UE station, a mobile station, a mobile console, a remote station, a remote terminal device, a mobile device, a UE terminal device, a terminal device, a wireless communication device, a UE agent, a UE apparatus, or the like. The terminal device may be fixed or movable. This is not limited in the embodiments of this application.

In the embodiments of this application, an apparatus configured to implement a terminal function may be a terminal, or may be an apparatus, for example, a chip system, that can support the terminal in implementing the function. The apparatus may be installed in the terminal. In the embodiments of this application, the chip system may include a chip, or may include a chip and another discrete component. In the technical solutions provided in the embodiments of this application, the technical solutions provided in the embodiments of this application are described by using an example in which the apparatus for implementing the terminal function is a terminal and the terminal is UE.

2. Network Device

The network device may be an access network device. The access network device may also be referred to as a radio access network (RAN) device, and is a device that provides a wireless communication function for a terminal device. For example, the access network device includes but is not limited to: a next-generation base station (generation NodeB, gNB) in 5G, an evolved NodeB (eNB), a radio network controller (RNC), a NodeB (NB), a base station controller (BSC), a base transceiver station (BTS), a home base station (for example, a home evolved NodeB or a home NodeB, HNB), a baseband unit (BBU), a transmission reception point (TRP), a transmission point (TP), a mobile switching center, and the like. Alternatively, the access network device may be a radio controller, a centralized unit (CU), and/or a distributed unit (DU) in a cloud radio access network (CRAN) scenario, or the network device may be a relay station, an access point, a vehicle-mounted device, a wearable device, a network device in a future 5G network, a network device in a future evolved PLMN network, or the like. The terminal device may communicate with a plurality of access network devices using different technologies. For example, the terminal device may communicate with an access network device supporting long term evolution (LTE), may communicate with an access network device supporting 5G, or may implement dual connectivity with an access network device supporting LTE and an access network device supporting 5G. This is not limited in the embodiments of this application.

In the embodiments of this application, an apparatus configured to implement a network device function may be a network device, or may be an apparatus, for example, a chip system, that can support the network device in implementing the function. The apparatus may be installed in the network device. In the technical solutions provided in the embodiments of this application, the technical solutions provided in the embodiments of this application are described by using an example in which the apparatus for implementing the network device function is a network device and the network device is a base station.

3. Beam

The beam may be embodied as a spatial domain filter in a protocol, or referred to as a spatial filter, a spatial parameter, or the like. A beam used to send a signal may be referred to as a transmission beam (Tx beam), a spatial domain transmission filter, a spatial transmission parameter, or the like. A beam used to receive a signal may be referred to as a reception beam (Rx beam), a spatial domain receive filter, a spatial reception parameter (spatial RX parameter), or the like.

The transmission beam may refer to distribution of signal strength formed in different directions in space after a signal is transmitted through an antenna, and the reception beam may refer to distribution of signal strength, in different directions in space, of a radio signal received from an antenna.

In addition, the beam may be a wide beam, a narrow beam, a beam of another type, or the like. A technology for forming the beam may be a beamforming technology or another technology. This is not limited. For example, the beamforming technology may be specifically a digital beamforming technology, an analog beamforming technology, or a hybrid digital/analog beamforming technology.

Optionally, a plurality of beams having same or similar communication characteristics may be considered as one beam. One beam may include one or more antenna ports, configured to transmit a data channel, a control channel, a sounding signal, and the like. The one or more antenna ports forming the beam may also be considered as one antenna port set.

The beam usually corresponds to a resource. For example, when beam measurement is performed, a network device measures different beams by using different resources, and a terminal device feeds back measured resource quality, so that the network device can determine quality of a corresponding beam.

In the embodiments of this application, unless otherwise specified, the beam is a transmission beam of the terminal device. During beam measurement, each beam of the network device corresponds to one resource. Therefore, an index of the resource may be used to uniquely identify the beam corresponding to the resource.

4. Resource

During beam measurement, a beam corresponding to a resource may be uniquely identified by using an index of the resource. The resource may be an uplink signal resource, or may be a downlink signal resource. An uplink signal includes but is not limited to a sounding reference signal (SRS) and a demodulation reference signal (DMRS). A downlink signal includes but is not limited to a channel state information reference signal (CSI-RS), a cell specific reference signal (CS-RS), a UE specific reference signal (user equipment specific reference signal, US-RS), a demodulation reference signal (DMRS), and a synchronization signal/physical broadcast channel block (SS/PBCH block). The SS/PBCH block may be referred to as a synchronization signal block (SSB) for short.

The network device may configure a resource by using radio resource control (RRC) signaling. In a configuration structure, one resource is one data structure, including a related parameter of an uplink/downlink signal corresponding to the resource, for example, a type of the uplink/downlink signal, a resource element that carries the uplink/downlink signal, sending time and a sending periodicity of the uplink/downlink signal, and a quantity of ports used to send the uplink/downlink signal. A resource of each uplink/downlink signal has a unique index, to identify the resource of the uplink/downlink signal. It may be understood that the index of the resource may also be referred to as an identifier of the resource. This is not limited in the embodiments of this application.

In the embodiments of this application, terms such as "first" and "second", for example, "a first condition, a first CSI-RS resource, and a second CSI-RS resource", are used only for purpose of distinguishing descriptions, cannot be understood as indicating or implying relative importance, and cannot be understood as indicating or implying an order. "At least one of the following items (pieces)" or a similar expression thereof refers to any combination of these items, including any combination of singular items (pieces) or plural items (pieces). For example, at least one item (piece) of a, b, or c may represent a, b, c, a and b, a and c, b and c, or a and b and c, where a, b, and c may be singular items (pieces) or plural items (pieces).

Figure 5:
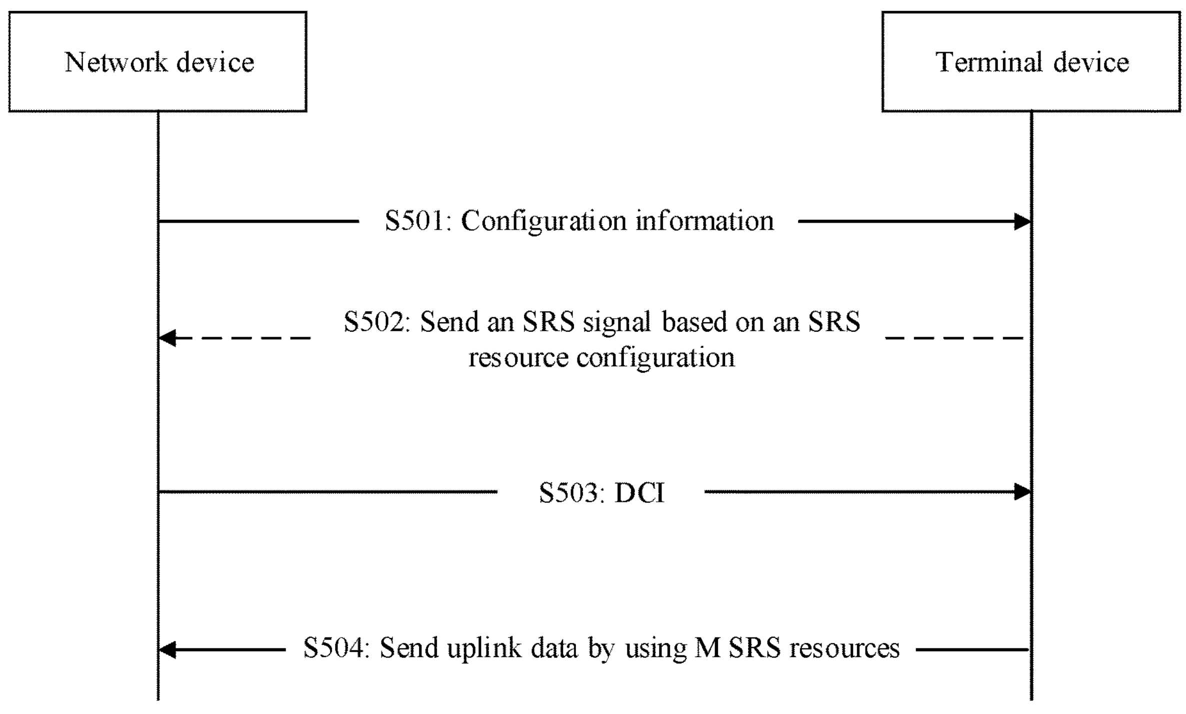
FIG. 5 is a flowchart of an uplink data transmission method according to an embodiment of this application.

As shown in FIG. 5, a process of an uplink data transmission method is provided. The method may be performed by a terminal device and a network device, a chip in a terminal device and a chip in a network device, or the like. In FIG. 5, the network device may be the network device 110 in FIG. 1 or the network device 210 in FIG. 2, and the terminal device may be the terminal device 120 in FIG. 1 or the terminal device 220 in FIG. 2. The method shown in FIG. 5 includes the following operations.

S501: The network device sends configuration information to the terminal device. Correspondingly, the terminal device receives the configuration information.

The configuration information includes information related to an SRS resource, and the configuration information may also be referred to as SRS resource configuration information. For example, the configuration information may include an SRS resource set, there is one or more SRS resource sets, a value of a usage parameter of the SRS resource set is configured as a codebook, the SRS resource set includes N SRS resources, and N is an integer greater than 0. One piece of spatial relation information is configured for each SRS resource. Each SRS resource may include one or more antenna ports. Alternatively, this may be described as that each SRS resource corresponds to one or more antenna ports.

Optionally, S502: The terminal device sends an SRS signal to the network device based on the SRS resource configuration information. Correspondingly, the network device measures the SRS signal and determines a quantity of spatial flows for uplink transmission and a precoding matrix.

S503: The network device sends downlink control information (DCI) to the terminal device. Correspondingly, the terminal device receives the DCI. The DCI includes an SRS resource indicator (SRI) field and a transmitted precoding matrix indicator (TPMI) field. M SRS resources used for uplink data transmission are jointly determined by using the SRI field and the TPMI field, and M is an integer greater than or equal to 1 and less than or equal to N. Alternatively, this may be described as that the SRI field and the TPMI field are used to jointly determine M SRS resources used for uplink data transmission.

S504: The terminal device sends uplink data by using the M SRS resources. Correspondingly, the network device receives the uplink data that is sent by the terminal device by using the M SRS resources.

After receiving the DCI, the terminal device may determine the M SRS resources based on a magnitude relationship between a quantity of antenna ports of the precoding matrix indicated by the TPMI field and a quantity of antenna ports of the N SRS resources.

If the quantity of antenna ports of the precoding matrix indicated by the TPMI field is equal to a sum of quantities of antenna ports of the N SRS resources, the terminal device determines that M is equal to N, that is, the M SRS resources used to send the uplink data are the N SRS resources in the configuration information in S501. For example, in S501, the network device configures two SRS resources, namely, an SRS #0 resource and an SRS #1 resource, for the terminal device. The terminal device performs uplink data transmission by using both the SRS #0 resource and the SRS #1 resource. Optionally, in this case, there is no SRI field in the DCI, or a length of the SRI field in the DCI is 0.

If the quantity of antenna ports of the precoding matrix indicated by the TPMI field is less than the sum of quantities of antenna ports of the N SRS resources, the terminal device determines that M is less than N, and determines the M SRS resources by using the SRI field. For example, the terminal device may determine, based on a value of the SRI field, the M SRS resources in SRS resources whose quantities of antenna ports are equal to the quantity of antenna ports of the precoding matrix indicated by the TPMI field. For example, the quantity of antenna ports of the precoding matrix indicated by the TPMI field is 2, the terminal device may determine, in the N SRS resources configured in the configuration information, an SRS resource whose quantity of antenna ports is 2. The terminal device determines, based on the value of the SRI field, the M SRS resources in the SRS resource whose quantity of antenna ports is 2. For example, in the N SRS resources, there are four SRS resources whose quantities of antenna ports are 2 and that respectively have indexes of 0 to 3. When the value of the SRI field is 00, it may indicate an SRS resource having an index of 0. When the value of the SRI field is 01, it may indicate an SRS resource having an index of 1. Alternatively, the terminal device may select, from the N SRS resources based on the value of the SRI field, the M SRS resources used for uplink data transmission. For example, the network device configures, for the terminal device, four SRS resources respectively having indexes of 0 to 3. When the value of the SRI field is 00, it may indicate an SRS resource having an index of 0. When the value of the SRI field is 01, it may indicate an SRS resource having an index of 1.

In this embodiment of this application, one SRS resource corresponds to one beam. That the terminal device sends uplink data by using the M SRS resources means that the terminal device sends the uplink data by using M beams corresponding to the M SRS resources. In this case, the quantity of antenna ports of the precoding matrix for uplink transmission is equal to the sum of quantities of antenna ports of the M SRS resources. That a value of M is 1 corresponds to single-beam uplink transmission. That the value of M is greater than 1 corresponds to multi-beam uplink transmission. A capacity and coverage of uplink transmission can be improved by using multi-beam uplink transmission.

Figure 6:
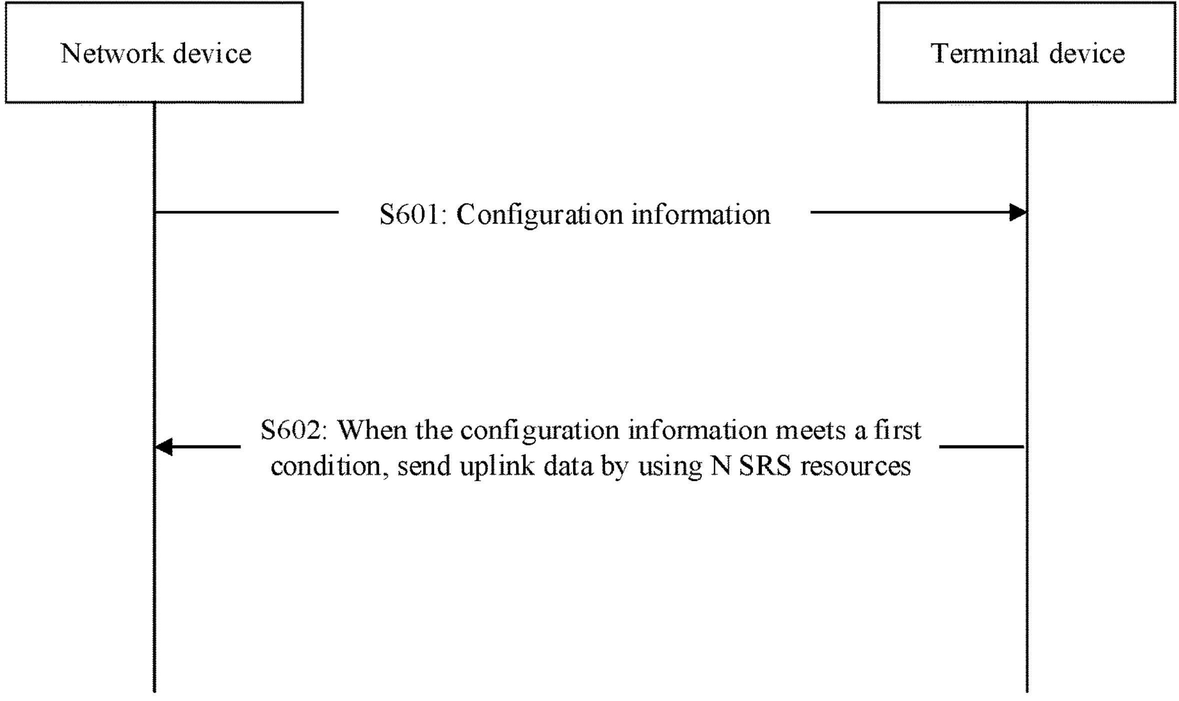
FIG. 6 is a flowchart of an uplink data transmission method according to an embodiment of this application.

As shown in FIG. 6, a process of an uplink data transmission method is provided. The process may be performed by a terminal device and a network device, a chip in a terminal device and a chip in a network device, or the like. In FIG. 6, the network device may be the network device 110 in FIG. 1 or the network device 210 in FIG. 2, and the terminal device may be the terminal device 120 in FIG. 1 or the terminal device 220 in FIG. 2. The method shown in FIG. 6 includes the following operations.

S601: The network device sends configuration information to the terminal device. For the configuration information, refer to the descriptions in FIG. 5. Correspondingly, the terminal device receives the configuration information.

S602: When the configuration information meets a first condition, the terminal device sends uplink data by using N SRS resources. Correspondingly, the network device receives the uplink data that is sent by the terminal device by using the N SRS resources. The first condition includes one of or a combination of a plurality of the following:

1. In the N SRS resources, time domain resources of all the SRS resources overlap with each other. For example, using an example in which a value of N is 2, the N SRS resources include an SRS #0 resource and an SRS #1 resource. That time domain resources of all the SRS resources overlap with each other means that time domain resources of the SRS #0 resource and the SRS #1 resource overlap with each other. The overlap is partial overlap or complete overlap. The partial overlap means that some of time domain symbols occupied by the N SRS resources are the same, and complete overlap means that all of the time domain symbols occupied by the N SRS resources are the same.
2. In the N SRS resources, time domain resources of at least two SRS resources overlap with each other. The overlap is partial overlap or complete overlap. Using an example in which the value of N is 3, three SRS resources are respectively an SRS #0 resource, an SRS #1 resource, and an SRS #2 resource. That time domain resources of at least two of the three SRS resources overlap with each other means that time domain resources of any two of the three SRS resources overlap with each other, or time domain resources of the three SRS resources completely overlap with each other.
3. In the N SRS resources, reference signal resources in spatial relation information (spatial relation info) parameters of all the SRS resources are different. It can be learned from the descriptions in S501 that one piece of spatial relation information is configured for each SRS resource, and the spatial relation information includes a reference signal resource. For example, using an example in which a value of N is 2, the N SRS resources include an SRS #0 resource and an SRS #1 resource. Spatial relation information configured for the SRS #0 resource includes a reference signal resource 0, and spatial relation information configured for the SRS #1 resource includes a reference signal resource 1. The reference signal resource 0 is different from the reference signal resource 1. It may be considered that the reference signal resources in the spatial relation information parameters of all the SRS resources in the N SRS resources are different.
4. In the N SRS resources, reference signal resources in spatial relation information parameters of at least two SRS resources are different. For example, using an example in which the value of N is 3, three SRS resources include an SRS #0 resource, an SRS #1 resource, and an SRS #2 resource. Spatial relation information configured for the SRS #0 resource includes a reference signal resource 0, spatial relation information configured for the SRS #1 resource includes a reference signal resource 1, and spatial relation information configured for the SRS #2 resource includes a reference signal resource 2. That in the N SRS resources, reference signal resources in spatial relation information parameters of at least two SRS resources are different means that at least two of the reference signal resource 0, the reference signal resource 1, and the reference signal resource 2 are different, or three reference signal resources are all different.
5. A value of N in the N SRS resources configured by the network device is greater than a preset value. The preset value may be stipulated in a protocol. This is not limited.

For example, in this embodiment of this application, when time domain resources corresponding to the N SRS resources in the SRS resource set all overlap with each other, and reference signal resources in spatial relation information parameters of the N SRS resources are all different (that is, 1 and 3 in the foregoing condition are met), the terminal device may send the uplink data by using the N SRS resources. When a value of N is 1, the terminal device may perform uplink data transmission by using a single beam. When the value of N is greater than 1, the terminal device may perform uplink data transmission by using a plurality of beams. A capacity and coverage of uplink transmission can be improved by using multi-beam uplink data transmission.

Figure 7:
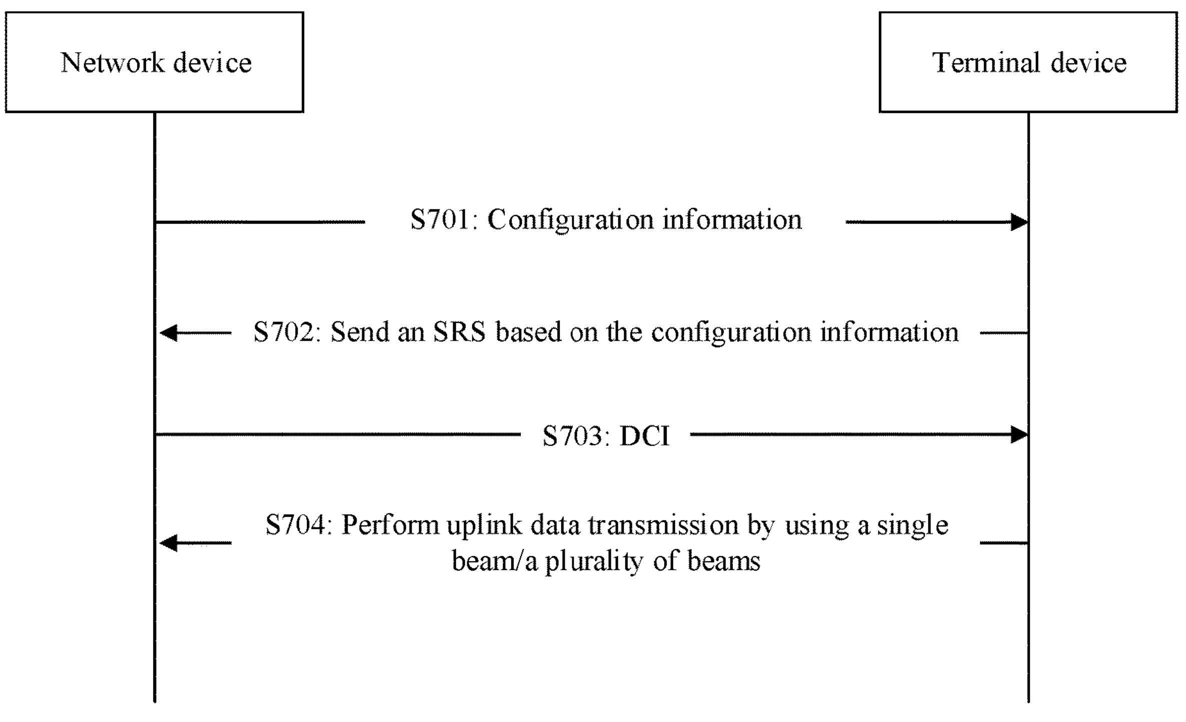
FIG. 7 is a flowchart of an uplink data transmission method according to an embodiment of this application.

As shown in FIG. 7, a process of an uplink data transmission method is provided. The process is specifically a specific implementation of the processes shown in FIG. 5 and FIG. 6. The process may be performed by a terminal device and a network device, or a chip in a terminal device and a chip in a network device. In the process of FIG. 7, the network device may be the network device 110 in FIG. 1 or the network device 210 in FIG. 2, and the terminal device may be the terminal device 120 in FIG. 1 or the terminal device 220 in FIG. 2. The method shown in FIG. 7 includes the following operations.

S701: The network device sends configuration information to the terminal device. Correspondingly, the terminal device receives the configuration information. For the configuration information, refer to the descriptions in S501. For ease of understanding, in the following descriptions, descriptions are provided by using an example in which the value of N is 2, and the SRS resource set includes two SRS resources, namely, an SRS #0 resource and an SRS #1 resource.

S702: The terminal device sends an SRS based on the configuration information. Correspondingly, the network device receives the SRS.

For example, still using the foregoing example, the terminal device may send an SRS #0 based on a configuration information of the SRS #0 resource. The terminal device sends an SRS #1 based on a configuration of the SRS #1 resource. Correspondingly, the terminal device receives the SRS #0 and the SRS #1.

S703: The network device sends downlink control information (DCI) to the terminal device. Correspondingly, the terminal device receives the DCI.

The network device may measure SRS signals corresponding to both the SRS resources. The network device determines an optimal uplink transmission scheme based on a measurement result. The optimal uplink transmission scheme may be performing uplink data transmission by using a single SRS resource, or the optimal uplink transmission scheme may be performing uplink data transmission by using a plurality of SRS resources.

For example, still using the foregoing example, the network device may measure the SRS #0 and the SRS #1, and the optimal uplink transmission scheme determined based on the measurement result may be: performing uplink data transmission by using the SRS #0 resource, performing uplink data transmission by using the SRS #1 resource, or performing uplink data transmission by using both the SRS #0 resource and the SRS #1 resource. Optionally, for each optimal uplink transmission scheme, the network device also needs to determine a corresponding quantity of transmission flows and a corresponding precoding matrix. Performing uplink data transmission by using the SRS #0 resource or the SRS #1 resource corresponds to performing uplink data transmission by using a single SRS resource. Performing uplink data transmission by using both the SRS #0 resource and the SRS #1 resource corresponds to performing uplink data transmission by using a plurality of SRS resources.

It may be understood that performing uplink data transmission by using a single SRS resource means performing uplink data transmission by using a transmission beam corresponding to the SRS resource or that a quantity of antenna ports of a precoding matrix corresponding to uplink transmission is equal to a quantity of antenna ports of the SRS resource. Performing uplink data transmission by using a plurality of SRS resources means performing uplink data transmission by using all transmission beams corresponding to the plurality of SRS resources or that the quantity of antenna ports of the precoding matrix corresponding to uplink transmission is equal to a sum of quantities of antenna ports of the plurality of SRS resources.

After determining the foregoing information, the network device may notify the terminal device of the information by using the DCI. For example, the network device may indicate an uplink transmission scheme by using DCI signaling, that is, indicate a specific SRS resource to be used for performing uplink data transmission by the terminal device. Optionally, the network device may further indicate a quantity of transmission flows for uplink data transmission and a precoding matrix by using DCI signaling.

Scheme 1: The Uplink Transmission Scheme is Explicitly Indicated by Using an SRI Field in the DCI.

The uplink transmission scheme is explicitly indicated by using a value of the SRI field in the DCI. Different values of the SRI field correspond to different uplink transmission schemes. The SRI field may indicate M SRS resources in the N SRS resources configured by the network device. M is an integer greater than 0 and less than or equal to N. For example, still using the foregoing example, the value of N is 2, two SRS resources configured by the network device are respectively an SRS #0 resource and an SRS #1 resource. One or two SRS resources may be indicated by using the SRI field. For example, when the value of the SRI field is 0, it indicates that uplink data transmission is performed by using the SRS #0 resource, that is, the SRI field is used to indicate the SRS #0 resource. When the value of the SRI field is 1, it indicates that uplink data transmission is performed by using the SRS #1 resource, that is, the SRI field is used to indicate the SRS #1 resource. When the value of the SRI field is 2, it indicates that uplink data transmission is performed by using both the SRS #0 resource and the SRS #1 resource. Optionally, the quantity of transmission flows for uplink transmission and/or the precoding matrix is indicated by using the TPMI field in the DCI, that is, the SRI field is used to indicate both the SRS #0 resource and the SRS #1 resource.

Scheme 2: The Uplink Transmission Scheme is Explicitly Indicated by Using the SRI Field and the TPMI Field in the DCI.

For example, the uplink transmission scheme is jointly indicated by using a value of the SRI field in the DCI and the quantity of antenna ports of the precoding matrix indicated by the TPMI field in the DCI. Further:

When the value of the SRI field is 0, and the quantity of antenna ports of the precoding matrix indicated by the TPMI field is equal to a quantity of antenna ports of the SRS #0 resource, it indicates that uplink data transmission is performed by using the SRS #0 resource.

When the value of the SRI field is 1, and the quantity of antenna ports of the precoding matrix indicated by the TPMI field is equal to a quantity of antenna ports of the SRS #1 resource, it indicates that uplink data transmission is performed by using the SRS #1 resource.

When the quantity of antenna ports of the precoding matrix indicated by the TPMI field is equal to a sum of quantities of antenna ports of the SRS #0 resource and the SRS #1 resource, it indicates that uplink data transmission is performed by using both the SRS #0 resource and the SRS #1 resource.

S704: The terminal device performs uplink data transmission by using a single beam/a plurality of beams.

The terminal device may perform single-beam or multi-beam uplink data transmission based on an indication of the DCI. If the network device indicates the terminal device to perform uplink data transmission by using beams corresponding to a plurality of SRS resources, the terminal device transmits uplink data by using the beams corresponding to the plurality of SRS resources, and a quantity of antenna ports used for uplink data transmission is equal to a sum of quantities of antenna ports of the plurality of SRS resources. If the network device indicates the terminal device to perform uplink data transmission by using a beam corresponding to a single SRS resource, the terminal device transmits uplink data by using the beam corresponding to single SRS resource, and a quantity of antenna ports used for uplink data transmission is equal to a quantity of antenna ports of the single SRS resource.

In this embodiment of this application, the network device may indicate the terminal device to perform uplink data transmission by using the beams corresponding to the plurality of SRS resources, to implement multi-beam uplink data transmission and improve a capacity and coverage of uplink transmission.

Figure 8:
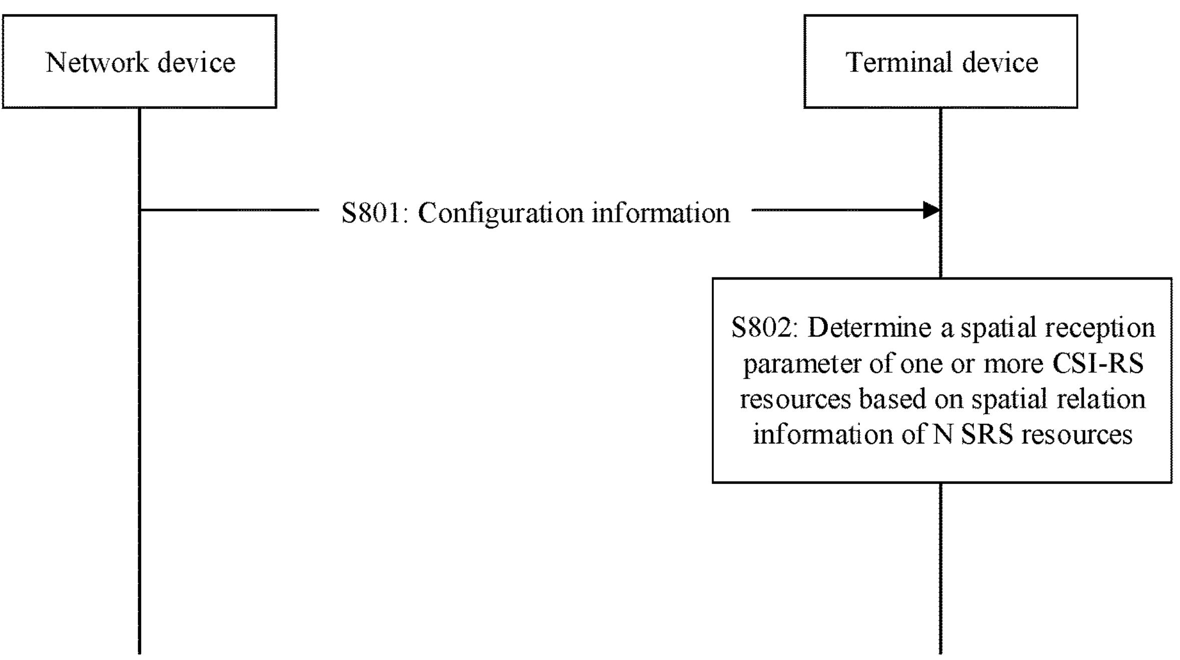
FIG. 8 is a flowchart of an uplink data transmission method according to an embodiment of this application.

As shown in FIG. 8, a process of an uplink data transmission method is provided. The process may be performed by a terminal device and a network device or a chip in a terminal device and a chip in a network device. In the process shown in FIG. 8, the network device may be the network device 110 in FIG. 1 or the network device 210 in FIG. 2, and the terminal device may be the terminal device 120 in FIG. 1 or the terminal device 220 in FIG. 2. The method shown in FIG. 8 includes the following operations.

S801: The network device sends configuration information to the terminal device. Correspondingly, the terminal device receives the configuration information.

The configuration information includes information related to an SRS resource. For example, the configuration information includes an SRS resource set, there is one or more SRS resource sets, and a usage parameter of the SRS resource set is a noncodebook. The SRS resource set includes N SRS resources, and N is an integer greater than 0. The SRS resource set is associated with one or more CSI-RS resources.

S802: The terminal device determines a spatial reception parameter of the one or more CSI-RS resources based on spatial relation information of the N SRS resources. The spatial reception parameter may also be referred to as a reception beam, a spatial domain receive filter, a spatial reception filter, or the like. For each CSI-RS resource associated with the SRS resource set, a spatial reception parameter of the CSI-RS resource may be determined based on the spatial relation information of the N SRS resources. For how to specifically determine the spatial reception parameter of the CSI-RS resource, refer to the following descriptions.

For example, one piece of spatial relation information (spatial relation info, or spatialRelationInfo) is configured for each SRS resource in the SRS resource set. Reference signal resources included in the spatial relation information of all the SRS resources are the same or different. The terminal device may determine a transmission configuration indication state (TCI-state) of the one or more CSI-RS resources by using all different spatial relation information in the spatial relation information corresponding to the N SRS resources. For example, the value of N is 2, and the SRS resource set includes two SRS resources, namely, an SRS #0 resource and an SRS #1 resource. Spatial relation information of the SRS #0 resource includes a reference signal resource 0, and spatial relation information of the SRS #1 resource includes a reference signal resource 1. The reference signal resource 0 is different from the reference signal resource 1. It may be considered that the spatial relation information of the SRS #0 resource is different from the spatial relation information of the SRS #1 resource. The SRS resource set is associated with one CSI-RS resource. A transmission configuration indication state of the CSI-RS resource may be determined based on the spatial relation information of the SRS #0 resource and the spatial relation information of the SRS #1 resource.

Alternatively, one piece of spatial relation information is configured for each SRS resource in the SRS resource set. Reference signal resources included in the spatial relation information of all the SRS resources are the same or different. The terminal device may determine a transmission configuration indication state of the one or more CSI-RS resources by using spatial relation information of an SRS resource having a smallest or largest resource index in the N SRS resources. It may be understood that the SRS resource having a smallest index may be specifically K1 SRS resources having a smallest index, and the SRS resource having a largest index may be specifically K2 SRS resources having a largest index. K1 and K2 are both integers greater than or equal to 1. For example, still using the foregoing example, the value of N is 2, the SRS resource set includes two SRS resources, and indexes of the two SRS resources are respectively an SRS #0 and an SRS #1. The SRS resource set is associated with one CSI-RS resource. A transmission configuration indication state of the CSI-RS resource may be determined based on spatial relation information of an SRS resource having a smaller index, namely, spatial relation information of an SRS #0 resource. Alternatively, a transmission configuration indication state of the CSI-RS resource is determined based on spatial relation information corresponding to an SRS resource having a larger index, namely, an SRS #1 resource.

Alternatively, spatial relation information is configured for only a part of SRS resources in the SRS resource set. The terminal device may determine a transmission configuration indication state of the one or more CSI-RS resources by using spatial relation information of an SRS resource having a smallest or largest resource index in SRS resources for which spatial relation information is configured in the N SRS resources. It may be understood that the SRS resource having a smallest index may be specifically K1 SRS resources having a smallest index, and the SRS resource having a largest index may be specifically K2 SRS resources having a largest index. K1 and K2 are both integers greater than or equal to 1. For example, the SRS resource set includes three SRS resources, namely, an SRS #0 resource, an SRS #1 resource, and an SRS #2 resource. Spatial relation information is configured for only the SRS #1 resource and the SRS #2 resource, and no spatial relation information is configured for the SRS #0 resource. The SRS resource set is associated with one CSI-RS resource. The terminal device may determine a transmission configuration indication state of the CSI-RS resource based on spatial relation information of an SRS resource having a smaller index in the SRS #1 resource and the SRS #2 resource, namely, spatial relation information of the SRS #1 resource. Alternatively, the terminal device may determine a transmission configuration indication state of the CSI-RS resource based on spatial relation information of an SRS resource having a larger index in the SRS #1 resource and the SRS #2 resource, namely, spatial relation information of the SRS #2 resource.

A transmission configuration indication state (for example, a TCI-state of a CSI-RS resource) of one downlink signal may be determined by using spatial relation information (for example, spatial relation information of an SRS resource) of one uplink signal specifically in any one or more of the following cases.

First case: A spatial reception parameter/reception beam of a downlink reference signal resource (if a reference signal resource in the spatial relation information is the downlink reference signal resource) included in the spatial relation information is used as a spatial reception parameter/reception beam of the downlink signal.

Second case: A downlink reference signal resource (if a reference signal resource in the spatial relation information is the downlink reference signal resource) included in the spatial relation information is used as a reference signal resource in the transmission configuration indication state.

There are two following cases for the foregoing second case: A downlink reference signal resource included in the spatial relation information is used as a reference signal resource in a quasi-co-location information (QCL-info) parameter whose type is a type D and that is in the transmission configuration indication state; or a downlink reference signal resource included in the spatial relation information is used as a reference signal resource in all QCL-info parameters in the transmission configuration indication state.

Third case: A spatial transmission parameter/transmission beam of an uplink reference signal resource (if a reference signal resource in the spatial relation information is the uplink reference signal resource) included in the spatial relation information is used as a spatial reception parameter/reception beam of the downlink signal.

Fourth case: An uplink reference signal resource (if a reference signal resource in the spatial relation information is the uplink reference signal resource) included in the spatial relation information is used as a reference signal resource in the transmission configuration indication state.

There are specifically two following cases for the foregoing fourth case: An uplink reference signal resource included in the spatial relation information is used as a reference signal resource in a QCL-info parameter whose type is a type D and that is in the transmission configuration indication state; or an uplink reference signal resource included in the spatial relation information is used as a reference signal resource in all QCL-info parameters in the transmission configuration indication state.

Fifth case: That a transmission configuration indication state of one downlink signal is determined by using a plurality of pieces of spatial relation information means that spatial transmission parameters/transmission beams corresponding to all reference signal resources included in the plurality of pieces of spatial relation information are used as a spatial transmission parameter/transmission beam of the downlink signal. For example, there are two pieces of spatial relation information that each include one downlink reference signal resource. Therefore, spatial reception parameters/reception beams of the two downlink reference signal resources are used as a spatial reception parameter/reception beam of the downlink signal. For another example, there are two pieces of spatial relation information that each include one uplink reference signal resource. Therefore, spatial transmission parameters/transmission beams of the two uplink reference signal resources are used as a spatial reception parameter/reception beam of the downlink signal. For another example, there are two pieces of spatial relation information that respectively include one uplink reference signal resource and one downlink reference signal resource. Therefore, a spatial transmission parameter/transmission beam of the uplink reference signal resource and a spatial reception parameter/reception beam of the downlink reference signal resource are used as a spatial reception parameter/reception beam of the downlink signal.

Optionally, when meeting one or more of the following conditions, the terminal device performs an action of S802. To be specific, the terminal device determines the transmission configuration indication state of the one or more CSI-RS resources based on the spatial relation information of the N SRS resources when a particular condition is met. Otherwise, the terminal device determines a spatial reception parameter of the one or more CSI-RS resources based on quasi-co-location information (QCL-info) whose type is a type D and that is in a transmission configuration indication state (TCI-state) configured for a CSI-RS resource. The conditions may be specifically as follows:

No spatial reception parameter is configured in the CSI-RS resource. For example, no TCI-state is configured in the CSI-RS resource, or a TCI-state configured in the CSI-RS resource does not include QCL-info whose type is a type D.

Spatial relation information is configured for at least one of the N SRS resources.

Spatial relation information is configured for each of the N SRS resources.

The spatial relation information corresponding to the N SRS resources is the same.

The spatial relation information corresponding to the N SRS resources is not exactly the same. Alternatively, this may be described as that spatial relation information corresponding to at least two of the N SRS resources is different.

The spatial relation information corresponding to the N SRS resources is completely different. Alternatively, this may be described as that spatial relation information corresponding to any two of the N SRS resources is different.

The SRS resource set includes a first field. The first field is used to indicate whether the transmission configuration indication state of the one or more CSI-RS resources is determined by using the spatial relation information of the N SRS resources. When a value of the first field is configured as a first value, it indicates that the transmission configuration indication state of the one or more CSI-RS resources is determined by using the spatial relation information of the N SRS resources. Alternatively, this may be described as that the transmission configuration indication state of the one or more CSI-RS resources is determined based on spatial relation information of the N SRS resources. When a value of the first field is configured as a second value, it indicates that the transmission configuration indication state of the one or more CSI-RS resources is determined not by using the spatial relation information of the N SRS resources. Alternatively, this may be described as that the transmission configuration indication state of the one or more CSI-RS resources is determined based on QCL-info in a TCI-state field.

It can be learned from the foregoing descriptions that the SRS resource set is associated with one or more CSI-RS resources. A transmission configuration indication state of each CSI-RS resource may be determined based on the spatial relation information of the N SRS resources. Correspondingly, there may be one or more transmission configuration indication states of each CSI-RS resource. In other words, the terminal device may receive the CSI-RS resource by using one or more reception beams. When the CSI-RS resource is received by using a plurality of reception beams, compared with receiving the CSI-RS resource by using a single beam, a capacity and coverage of downlink transmission can be improved.

Figure 9:
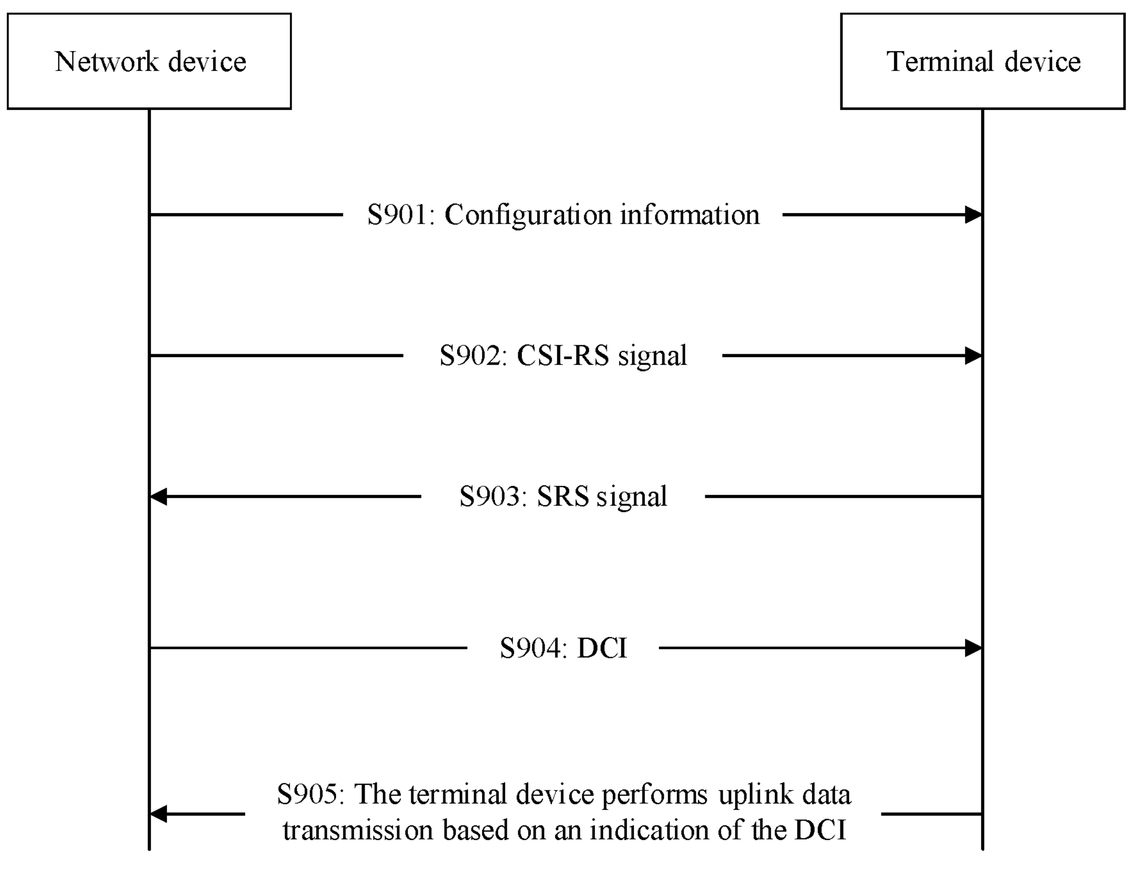
FIG. 9 is a flowchart of an uplink data transmission method according to an embodiment of this application.

As shown in FIG. 9, a process of an uplink data transmission method is provided. The process may be specifically a specific implementation of the process shown in FIG. 8. The process may be performed by a terminal device and a network device, or a chip in a terminal device and a chip in a network device. In the process shown in FIG. 9, the network device may be the network device 110 in FIG. 1 or the network device 210 in FIG. 2, and the terminal device may be the terminal device 120 in FIG. 1 or the terminal device 220 in FIG. 2. The method shown in FIG. 9 includes the following operations.

S901: The network device sends configuration information to the terminal device. Correspondingly, the terminal device receives the configuration information.

The configuration information includes an SRS resource set whose usage parameter is a noncodebook, there is one or more SRS resource sets, and the SRS resource set includes a plurality of SRS resources. One piece of spatial relation information may be configured for each SRS resource, and spatial relation information of all the SRS resources may be the same or different. Each SRS resource includes one or more antenna ports. The SRS resource set further includes one CSI-RS resource. Alternatively, this may be described as that the SRS resource set is associated with one CSI-RS resource. Optionally, one TCI-state may be configured for the associated CSI-RS resource, and the TCI-state may be configured in the CSI-RS resource, or the TCI-state may be configured in the SRS resource set. For example, for an aperiodic SRS resource set, when an associated CSI-RS resource is configured, a TCI-state of a CSI-RS resource also needs to be configured in the SRS resource set. In this embodiment of this application, the CSI-RS resource may be a no zero power (NZP) CSI-RS resource, a zero power (ZP) CSI-RS resource, or the like. This is not limited.

In noncodebook-based uplink data transmission, a transmission beam and a reception beam corresponding to the CSI-RS resource of the SRS resource set and a transmission beam and a reception beam of the SRS resource in the SRS resource set are reciprocal. To be specific, the transmission beam corresponding to the CSI-RS resource is the reception beam corresponding to the SRS resource, and the reception beam corresponding to the CSI-RS resource is the transmission beam corresponding to the SRS resource. In this way, a precoding matrix for uplink data transmission can be determined by measuring a downlink CSI-RS signal. To make the transmission beam and the reception beam of the CSI-RS resource and the transmission beam and the reception beam of the SRS resource meet a reciprocity requirement, the following manner may be used: The TCI-state of the CSI-RS resource is determined with reference to spatial relation information of the SRS resource in the SRS resource set associated with the CSI-RS resource.

That the TCI-state of the CSI-RS resource is determined with reference to spatial relation information of the SRS resource in the SRS resource set associated with the CSI-RS resource may mean that a reference signal resource in the spatial relation information of the SRS resource in the SRS resource set associated with the CSI-RS resource is used as a reference signal resource in the TCI-state of the CSI-RS resource. Specifically, the reference signal resource in the spatial relation information of the SRS resource may be used as a reference signal resource in QCL-info whose type is D and that is in the TCI-state. To be specific, the transmission beam corresponding to the SRS resource is used as the reception beam of the CSI-RS resource, or the reference signal resource in the spatial relation information of the SRS resource may be used as a reference signal resource in QCL-info of another type.

Alternatively, that the TCI-state of the CSI-RS resource is determined with reference to spatial relation information of the SRS resource in the SRS resource set associated with the CSI-RS resource may mean with reference to spatial relation information of one SRS resource in the SRS resource set, for example, with reference to spatial relation information of an SRS resource having a smallest or largest reference index value, or mean with reference to spatial relation information of a plurality of SRS resources in the SRS resource set, for example, with reference to spatial relation information of all the SRS resources in the SRS resource set. That the TCI-state of the CSI-RS resource is determined with reference to spatial relation information of a plurality of SRS resources may mean receiving the CSI-RS resource by using all transmission beams of the plurality of SRS resources.

The TCI-state of the CSI-RS resource may be determined with reference to the spatial relation information of the SRS resource in the SRS resource set associated with the CSI-RS resource by default in a protocol or when a particular condition is met. The particular condition includes one of or a combination of a plurality of the following:

The TCI-state of the CSI-RS resource is not configured.

QCL-info of a type D is not configured in the TCI-state of the CSI-RS resource.

Spatial relation information is configured for the SRS resource in the SRS resource set associated with the CSI-RS resource.

In the SRS resource set associated with the CSI-RS resource, reference signal resources corresponding to the spatial relation information of all the SRS resources are not exactly the same.

In the SRS resource set associated with the CSI-RS resource, reference signal resources corresponding to spatial relation information of different SRS resources are different.

A value of a specific field in the SRS resource set is configured as a particular value. The field may indicate whether the TCI-state of the CSI-RS resource associated with the SRS resource set is determined with reference to the spatial relation information of the SRS resource in the SRS resource set.

It may be understood that in this embodiment of this application, sending or receiving the CSI-RS resource may be sending/receiving a CSI-RS signal corresponding to the CSI-RS resource. Similarly, the foregoing expression is also applicable to descriptions of sending another resource. That the TCI-state of the CSI-RS resource is determined with reference to spatial relation information of the SRS resource may be alternatively expressed as that the TCI-state of the CSI-RS resource is determined with reference to the SRS resource, or the CSI-RS resource is determined with reference to the spatial relation information of the SRS resource, or the CSI-RS resource is determined with reference to the SRS resource, or a reception beam of the CSI-RS resource is determined with reference to a transmission beam of the SRS resource. This is not limited.

S902: The network device sends a CSI-RS signal. Correspondingly, the terminal device receives the CSI-RS signal.

For example, the network device may send the CSI-RS signal to the terminal device based on a configuration of the CSI-RS resource. The terminal device may receive the CSI-RS signal based on the configuration of the CSI-RS resource. Specifically, when the TCI-state of the CSI-RS resource is determined with reference to the spatial relation information of the SRS resource in the SRS resource set associated with the CSI-RS resource, the terminal device may determine the reception beam of the CSI-RS resource based on an association relationship. For example, when the TCI-state of the CSI-RS resource is determined with reference to the spatial relation information of the plurality of SRS resources, and transmission beams corresponding to the plurality of SRS resources are different, the terminal device may receive the CSI-RS signal by using all the transmission beams corresponding to the plurality of SRS resources, to indicate a plurality of reception beams of the CSI-RS resource.

S903: The terminal device sends an SRS signal. Correspondingly, the network device receives the SRS signal.

The terminal device may measure the CSI-RS signal and determine one or more precoding matrices. The terminal device may send the SRS signal to the network device based on the one or more precoding matrices and based on an SRS resource configuration information. Alternatively, the foregoing process may be described as that the terminal device sends one or more groups of SRS signals, each group of SRS signals corresponds to one or more SRS resources, and each group of SRS signals uses a precoding matrix.

S904: The network device sends DCI. Correspondingly, the terminal device receives the DCI.

The terminal device may measure the groups of SRS signals, determine one group of optimal SRS signals, and then notify the terminal device of an SRS resource corresponding to the group of SRS signals by using the DCI.

S905: The terminal device performs uplink data transmission based on an indication of the DCI.

The terminal device may determine an SRS resource for uplink data transmission based on an SRS resource indicated in the DCI, to determine a transmission beam for uplink data transmission. For example, the SRS resources indicated in the DCI are an SRS #0 resource and an SRS #1 resource. Transmission beams corresponding to the SRS #0 resource and the SRS #1 resource are different. The terminal device may perform uplink data transmission by using both the transmission beams corresponding to the two SRS resources. In addition, a precoding matrix used for uplink data transmission is also determined based on the SRS resource indicated in the DCI. A quantity of antenna ports used for uplink data transmission, namely, a sum of quantities of antenna ports of the precoding matrix, is equal to a sum of quantities of antenna ports of the SRS resource.

It can be learned from the foregoing descriptions that the network device may indicate the terminal device to receive the CSI-RS resource by using the transmission beams corresponding to the plurality of SRS resources, so that the plurality of reception beams of the CSI-RS resource and a plurality of transmission beams of the SRS resource are reciprocal, so that noncodebook-based multi-beam uplink transmission can be performed.

The embodiments described in this specification may be independent solutions, or may be combined based on internal logic. These solutions all fall within the protection scope of this application.

It may be understood that in the foregoing method embodiments, methods and operations implemented by the terminal device may alternatively be implemented by a component (for example, a chip or a circuit) of the terminal device. Methods and operations implemented by the network device may alternatively be implemented by a component (for example, a chip or a circuit) of the network device. In the embodiments provided in this application, the methods provided in the embodiments of this application are described from perspectives of the network device, the terminal, and interaction between the network device and the terminal. To implement functions in the foregoing methods provided in the embodiments of this application, the network device and the terminal may include a hardware structure and/or a software module, and implement the foregoing functions in a form of the hardware structure, the software module, or a combination of the hardware structure and the software module. Whether a function in the foregoing functions is performed by using the hardware structure, the software module, or the combination of the hardware structure and the software module depends on particular applications and design constraints of the technical solutions.

The methods provided in the embodiments of this application are described above in detail with reference to FIG. 5 to FIG. 9. A communication apparatus according to an embodiment of this application is described below in detail with reference to FIG. 10 and FIG. 11. It should be understood that descriptions for communication apparatus embodiments correspond to the descriptions for the method embodiments. Therefore, for content that is not described in detail, refer to the descriptions in the foregoing method embodiments.

Figure 10:
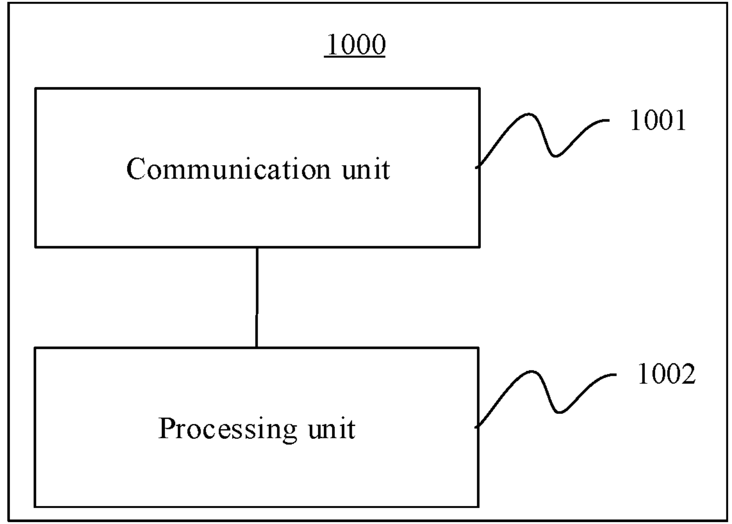
FIG. 10 is a schematic diagram of a structure of an apparatus according to an embodiment of this application.

FIG. 10 is a schematic block diagram of a communication apparatus 1000 according to an embodiment of this application. The communication apparatus 1000 is configured to implement functions of the network device or the terminal device in the foregoing methods. For example, the apparatus may be a software module or a chip system. The chip system may include a chip, or may include a chip and another discrete component. The apparatus 1000 includes a communication unit 1001, and may further include a processing unit 1002. The communication unit 1001 may communicate with the outside. The processing unit 1002 is configured to perform processing, for example, control the communication unit 1001 to send uplink data by using M SRS resources. The communication unit 1001 may also be referred to as a communication interface, a transceiver unit, an input/output interface, or the like. For example, the communication unit 1001 may include a sending unit and/or a receiving unit, respectively configured to perform the sending or receiving step of the terminal device or the network device in the foregoing processes of FIG. 5 to FIG. 9.

In an example, the communication apparatus 1000 may implement the step performed by the terminal device in the foregoing process in FIG. 5, and the communication apparatus 1000 may be the terminal device or a chip or a circuit configured in the terminal device. The communication unit 1001 is configured to perform a sending/receiving-related operation on a terminal device side in the foregoing method embodiments, and the processing unit 1002 is configured to perform a processing-related operation of the terminal device in the foregoing method embodiments.

For example, the communication unit 1001 is configured to receive configuration information from a network device, where the configuration information includes an SRS resource set, a value of a usage parameter of the SRS resource set is configured as a codebook, the SRS resource set includes N SRS resources, and N is an integer greater than 0. The communication unit 1001 is further configured to receive downlink control information from the network device. The processing unit 1002 is further configured to jointly determine, by using an SRI field and a TPMI field in the downlink control information, M SRS resources used for uplink data transmission, where M is an integer greater than or equal to 1 and less than or equal to N. The processing unit 1002 is further configured to control the communication unit 1001 to send uplink data by using the M SRS resources.

Optionally, when jointly determining, by using the SRI field and the TPMI field in the downlink control information, the M SRS resources used for uplink data transmission, the processing unit 1002 is specifically configured to: if a quantity of antenna ports corresponding to a precoding matrix indicated by the TPMI field is equal to a sum of quantities of antenna ports of the N SRS resources, determine that M is equal to N, and the M SRS resources used to send the uplink data are the N SRS resources.

Optionally, when the quantity of antenna ports of the precoding matrix indicated by the TPMI field is equal to the sum of the quantities of antenna ports of the N SRS resources, the processing unit 1002 is specifically configured to determine that there is no SRI field in the downlink control information, or a length of the SRI field is 0.

Optionally, when jointly determining, by using the SRI field and the TPMI field in the downlink control information, the M SRS resources used for uplink data transmission, the processing unit 1002 is specifically configured to: if a quantity of antenna ports corresponding to a precoding matrix indicated by the TPMI field is less than a sum of quantities of antenna ports of the N SRS resources, determine that M is less than N and determine the M SRS resources by using the SRI field.

Optionally, when determining the M SRS resources by using the SRI field, the processing unit 1002 is specifically configured to: determine, in SRS resources whose quantities of antenna ports are equal to the quantity of antenna ports of the precoding matrix indicated by the TPMI field and based on a value of the SRI field, the M SRS resources used for uplink data transmission.

In an example, the communication apparatus 1000 may implement the step performed by the network device in the foregoing process in FIG. 5, and the communication apparatus 1000 may be the network device or a chip or a circuit configured in the network device. The communication unit 1001 is configured to perform a sending/receiving-related operation on a network device side in the foregoing method embodiments, and the processing unit 1002 is configured to perform a processing-related operation of the network device in the foregoing method embodiments.

For example, the communication unit 1001 is configured to send configuration information to a terminal device, where the configuration information includes an SRS resource set, a value of a usage parameter of the SRS resource set is configured as a codebook, the SRS resource set includes N SRS resources, and N is an integer greater than 0. The communication unit 1001 is further configured to send downlink control information to the terminal device, where a spatial rank index (SRI) field and a transmitted precoding matrix indicator (TPMI) field in the downlink control information are used to jointly determine M SRS resources used for uplink data transmission, and M is an integer greater than or equal to 1 and less than or equal to N. The communication unit 1001 is further configured to receive uplink data that is sent by the terminal device by using the M SRS resources. The processing unit 1002 is configured to process the uplink data.

Optionally, that the SRI field and the TPMI field in the downlink control information are used to jointly determine the M SRS resources used for uplink data transmission includes: If a quantity of antenna ports of a precoding matrix indicated by the TPMI field is equal to a sum of quantities of antenna ports of the N SRS resources, M is equal to N, and the M SRS resources used to send the uplink data are the N SRS resources.

Optionally, when the quantity of antenna ports of the precoding matrix indicated by the TPMI field is equal to the sum of the quantities of antenna ports of the N SRS resources, there is no SRI field in the downlink control information, or a length of the SRI field is 0.

Optionally, that the SRI field and the TPMI field in the downlink control information are used to jointly determine the M SRS resources used for uplink data transmission includes: If a quantity of antenna ports of a precoding matrix indicated by the TPMI field is less than a sum of quantities of antenna ports of the N SRS resources, M is less than N, and the M SRS resources are determined by using the SRI field.

In an example, the communication apparatus 1000 may implement the step performed by the terminal device in the foregoing process in FIG. 6, and the communication apparatus 1000 may be the terminal device or a chip or a circuit configured in the terminal device. The communication unit 1001 is configured to perform a sending/receiving-related operation on a terminal device side in the foregoing method embodiments, and the processing unit 1002 is configured to perform a processing-related operation of the terminal device in the foregoing method embodiments.

The communication unit 1001 is configured to receive configuration information from a network device, where the configuration information includes a sounding reference signal (SRS) resource set, a value of a usage parameter of the SRS resource set is configured as a codebook, the SRS resource set includes N SRS resources, and N is an integer greater than 0. The processing unit 1002 is configured to, when the configuration information meets a first condition, control the communication unit 1001 to send uplink data by using the N SRS resources.

Optionally, the first condition includes one of or a combination of a plurality of the following: In the N SRS resources, time domain resources of all the SRS resources overlap with each other; in the N SRS resources, time domain resources of at least two SRS resources overlap with each other; in the N SRS resources, reference signal resources in spatial relation information parameters of all the SRS resources are different; in the N SRS resources, reference signal resources in spatial relation information parameters of at least two SRS resources are different; or a value of N is greater than a preset value.

In an example, the communication apparatus 1000 may implement the step performed by the terminal device in the foregoing process in FIG. 8, and the communication apparatus 1000 may be the terminal device or a chip or a circuit configured in the terminal device. The communication unit 1001 is configured to perform a sending/receiving-related operation on a terminal device side in the foregoing method embodiments, and the processing unit 1002 is configured to perform a processing-related operation of the terminal device in the foregoing method embodiments.

For example, the communication unit 1001 is configured to receive configuration information from a network device, where the configuration information includes an SRS resource set, a value of a usage parameter of the SRS resource set is configured as a noncodebook, the SRS resource set includes N SRS resources, the SRS resource set is associated with one or more CSI-RS resources, and N is an integer greater than 0. The processing unit 1002 is configured to determine a spatial reception parameter of the one or more CSI-RS resources based on spatial relation information of the N SRS resources.

Optionally, when determining the spatial reception parameter of the one or more CSI-RS resources based on the spatial relation information of the N SRS resources, the processing unit 1002 is specifically configured to: use all different spatial relation information in the spatial relation information corresponding to the N SRS resources as the spatial reception parameter of the one or more CSI-RS resources; use spatial relation information of an SRS resource having a smallest or largest resource index in the N SRS resources as the spatial reception parameter of the one or more CSI-RS resources; or use spatial relation information of an SRS resource having a smallest or largest resource index in SRS resources for which spatial relation information is configured in the N SRS resources as the spatial reception parameter of the one or more CSI-RS resources.

Optionally, the processing unit 1002 determines the spatial reception parameter of the one or more CSI-RS resources based on the spatial relation information of the N SRS resources when one or more of the following conditions are met: A transmission configuration indication state is not configured in the CSI-RS resource; a transmission configuration indication state configured in the CSI-RS resource does not include information whose type is a type D; spatial relation information is configured for at least one of the N SRS resources; spatial relation information is configured for each of the N SRS resources; the spatial relation information corresponding to the N SRS resources is the same; the spatial relation information corresponding to the N SRS resources is not exactly the same; the spatial relation information corresponding to the N SRS resources is completely different; or a value of a first field in the SRS resource set is configured as a preset value.

Optionally, the first field is used to indicate whether the spatial reception parameter of the one or more CSI-RS resources is determined by using the spatial relation information of the N SRS resources.

In the embodiments of this application, division into the units is an example, is merely logical function division, and may be other division during actual implementation. In addition, function units in the embodiments of this application may be integrated into one processor, or may exist alone physically, or two or more units may be integrated into one unit. The integrated unit may be implemented in a form of hardware, or may be implemented in a form of a software function unit.

It can be understood that in the foregoing embodiment, functions of the communication unit can be implemented by a transceiver, and functions of the processing unit can be implemented by the processor. The transceiver may include a transmitter and/or a receiver, respectively configured to implement functions of the sending unit and/or the receiving unit. Descriptions are provided below by way of example with reference to FIG. 11.

Figure 11:
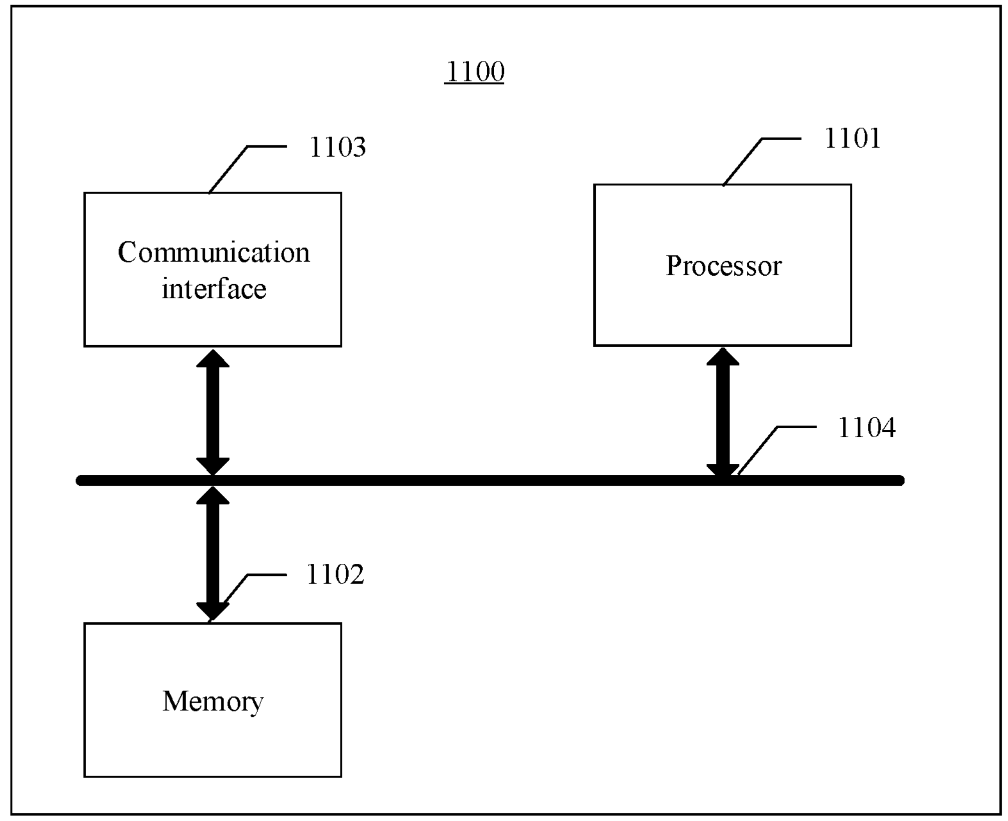
FIG. 11 is a schematic diagram of a structure of an apparatus according to an embodiment of this application.

FIG. 11 is a schematic block diagram of the communication apparatus 1100 according to an embodiment of this application. The communication apparatus 1100 shown in FIG. 11 may be an implementation of a hardware circuit of the apparatus shown in FIG. 10. The apparatus is applicable to the processes shown in FIG. 5 to FIG. 9 and executes the functions of the network device or the terminal device in the foregoing method embodiments. For ease of description, FIG. 11 only shows main components of the communication apparatus.

The communication apparatus 1100 shown in FIG. 11 includes at least one processor 1101. The communication apparatus 1100 may further include at least one memory 1102, configured to store a program instruction and/or data. The memory 1102 is coupled to the processor 1101. The coupling in this embodiment of this application is an indirect coupling or a communication connection between apparatuses, units, or modules, may be in an electrical form, a mechanical form, or another form, and is used for information exchange between the apparatuses, the units, or the modules. The processor 1101 may cooperate with the memory 1102, the processor 1101 may execute a program instruction stored in the memory 1102, and at least one of the at least one memory 1102 may be included in the processor 1101.

The communication apparatus 1100 may further include a communication interface 1103, configured to communicate with another device by using a transmission medium, so that the communication apparatus 1100 can communicate with another device. In this embodiment of this application, the communication interface may be a transceiver, a circuit, a bus, a module, or a communication interface of another type. In this embodiment of this application, when the communication interface is a transceiver, the transceiver may include an independent receiver and an independent transmitter, or may be a transceiver integrated with a transceiver function or an interface circuit.

It should be understood that connection media between the processor 1101, the memory 1102, and the communication interface 1103 are not limited in this embodiment of this application. In this embodiment of this application, in FIG. 11, the memory 1102, the processor 1101, and the communication interface 1103 are connected with each other by using a communication bus 1104. The bus is represented by a thick line in FIG. 11, and connection manners of other components are merely for schematic descriptions and are not construed as a limitation. The bus may include an address bus, a data bus, a control bus, and the like. For ease of representation, only one thick line is used to represent the bus in FIG. 11, but this does not mean that there is only one bus or only one type of bus.

In an example, the communication apparatus 1100 is configured to implement steps performed by the terminal device in the process shown in FIG. 5. The communication interface is configured to perform a sending/receiving-related operation on a terminal device side in the foregoing method embodiments, and the processor is configured to perform a processing-related operation of the terminal device in the foregoing method embodiments.

The communication interface 1103 is configured to receive configuration information from a network device, where the configuration information includes an SRS resource set, a value of a usage parameter of the SRS resource set is configured as a codebook, the SRS resource set includes N SRS resources, and N is an integer greater than 0. The communication interface 1103 is further configured to receive downlink control information from the network device. The processor 1101 is further configured to jointly determine, by using an SRI field and a TPMI field in the downlink control information, M SRS resources used for uplink data transmission, where M is an integer greater than or equal to 1 and less than or equal to N. The processor 1101 is further configured to control the communication interface 1103 to send uplink data by using the M SRS resources.

Optionally, when jointly determining, by using the SRI field and the TPMI field in the downlink control information, the M SRS resources used for uplink data transmission, the processor 1101 is specifically configured to: if a quantity of antenna ports corresponding to a precoding matrix indicated by the TPMI field is equal to a sum of quantities of antenna ports of the N SRS resources, determine that M is equal to N, and the M SRS resources used to send the uplink data are the N SRS resources.

Optionally, when the quantity of antenna ports of the precoding matrix indicated by the TPMI field is equal to the sum of the quantities of antenna ports of the N SRS resources, the processor 1101 is specifically configured to determine that there is no SRI field in the downlink control information, or a length of the SRI field is 0.

Optionally, when jointly determining, by using the SRI field and the TPMI field in the downlink control information, the M SRS resources used for uplink data transmission, the processor 1101 is specifically configured to: if a quantity of antenna ports corresponding to a precoding matrix indicated by the TPMI field is less than a sum of quantities of antenna ports of the N SRS resources, determine that M is less than N and determine the M SRS resources by using the SRI field.

Optionally, when determining the M SRS resources by using the SRI field, the processor 1101 is specifically configured to: determine, in SRS resources whose quantities of antenna ports are equal to the quantity of antenna ports of the precoding matrix indicated by the TPMI field and based on a value of the SRI field, the M SRS resources used for uplink data transmission.

In an example, the communication apparatus 1100 may implement the step performed by the network device in the foregoing process in FIG. 5, and the communication apparatus 1100 may be the network device or a chip or a circuit configured in the network device. The communication interface 1103 is configured to perform a sending/receiving-related operation on a network device side in the foregoing method embodiments, and the processor 1101 is configured to perform a processing-related operation of the network device in the foregoing method embodiments.

For example, the communication interface 1103 is configured to send configuration information to a terminal device, where the configuration information includes an SRS resource set, a value of a usage parameter of the SRS resource set is configured as a codebook, the SRS resource set includes N SRS resources, and N is an integer greater than 0. The communication interface 1103 is further configured to send downlink control information to the terminal device, where a spatial rank index (SRI) field and a transmitted precoding matrix indicator (TPMI) field in the downlink control information are used to jointly determine M SRS resources used for uplink data transmission, and M is an integer greater than or equal to 1 and less than or equal to N. The communication interface 1103 is further configured to receive uplink data that is sent by the terminal device by using the M SRS resources. The processor 1101 is configured to process the uplink data.

Optionally, that the SRI field and the TPMI field in the downlink control information are used to jointly determine the M SRS resources used for uplink data transmission includes: If a quantity of antenna ports of a precoding matrix indicated by the TPMI field is equal to a sum of quantities of antenna ports of the N SRS resources, M is equal to N, and the M SRS resources used to send the uplink data are the N SRS resources.

Optionally, when the quantity of antenna ports of the precoding matrix indicated by the TPMI field is equal to the sum of the quantities of antenna ports of the N SRS resources, there is no SRI field in the downlink control information, or a length of the SRI field is 0.

Optionally, that the SRI field and the TPMI field in the downlink control information are used to jointly determine the M SRS resources used for uplink data transmission includes: If a quantity of antenna ports of a precoding matrix indicated by the TPMI field is less than a sum of quantities of antenna ports of the N SRS resources, M is less than N, and the M SRS resources are determined by using the SRI field.

In an example, the communication apparatus 1100 may implement the step performed by the terminal device in the foregoing process in FIG. 6, and the communication apparatus 1100 may be the terminal device or a chip or a circuit configured in the terminal device. The communication interface 1103 is configured to perform a sending/receiving-related operation on a terminal device side in the foregoing method embodiments, and the processor 1101 is configured to perform a processing-related operation of the terminal device in the foregoing method embodiments.

The communication interface 1103 is configured to receive configuration information from a network device, where the configuration information includes a sounding reference signal (SRS) resource set, a value of a usage parameter of the SRS resource set is configured as a codebook, the SRS resource set includes N SRS resources, and N is an integer greater than 0. The processor 1101 is configured to, when the configuration information meets a first condition, control the communication interface 1103 to send uplink data by using the N SRS resources.

Optionally, the first condition includes one of or a combination of a plurality of the following: In the N SRS resources, time domain resources of all the SRS resources overlap with each other; in the N SRS resources, time domain resources of at least two SRS resources overlap with each other; in the N SRS resources, reference signal resources in spatial relation information parameters of all the SRS resources are different; in the N SRS resources, reference signal resources in spatial relation information parameters of at least two SRS resources are different; or a value of N is greater than a preset value.

In an example, the communication apparatus 1100 may implement the step performed by the terminal device in the foregoing process in FIG. 8, and the communication apparatus 1100 may be the terminal device or a chip or a circuit configured in the terminal device. The communication interface 1103 is configured to perform a sending/receiving-related operation on a terminal device side in the foregoing method embodiments, and the processor 1101 is configured to perform a processing-related operation of the terminal device in the foregoing method embodiments.

For example, the communication interface 1103 is configured to receive configuration information from a network device, where the configuration information includes an SRS resource set, a value of a usage parameter of the SRS resource set is configured as a noncodebook, the SRS resource set includes N SRS resources, the SRS resource set is associated with one or more CSI-RS resources, and N is an integer greater than 0. The processor 1101 is configured to determine a spatial reception parameter of the one or more CSI-RS resources based on spatial relation information of the N SRS resources.

Optionally, when determining the spatial reception parameter of the one or more CSI-RS resources based on the spatial relation information of the N SRS resources, the processor 1101 is specifically configured to: use all different spatial relation information in the spatial relation information corresponding to the N SRS resources as the spatial reception parameter of the one or more CSI-RS resources; use spatial relation information of an SRS resource having a smallest or largest resource index in the N SRS resources as the spatial reception parameter of the one or more CSI-RS resources; or use spatial relation information of an SRS resource having a smallest or largest resource index in SRS resources for which spatial relation information is configured in the N SRS resources as the spatial reception parameter of the one or more CSI-RS resources.

Optionally, the processor 1101 determines the spatial reception parameter of the one or more CSI-RS resources based on the spatial relation information of the N SRS resources when one or more of the following conditions are met: A transmission configuration indication state is not configured in the CSI-RS resource; a transmission configuration indication state configured in the CSI-RS resource does not include information whose type is a type D; spatial relation information is configured for at least one of the N SRS resources; spatial relation information is configured for each of the N SRS resources; the spatial relation information corresponding to the N SRS resources is the same; the spatial relation information corresponding to the N SRS resources is not exactly the same; the spatial relation information corresponding to the N SRS resources is completely different; or a value of a first field in the SRS resource set is configured as a preset value.

Optionally, the first field is used to indicate whether the spatial reception parameter of the one or more CSI-RS resources is determined by using the spatial relation information of the N SRS resources.

In the embodiments of this application, the processor may be a general-purpose processor, a digital signal processor, an application-specific integrated circuit, a field programmable gate array or another programmable logic device, a discrete gate or transistor logic device, or a discrete hardware component, and may implement or perform the methods, steps, and logical block diagrams disclosed in the embodiments of this application. The general-purpose processor may be a microprocessor, any conventional processor, or the like. The steps of the methods disclosed with reference to the embodiments of this application may be directly performed and completed by a hardware processor, or may be performed and completed by using a combination of hardware and software modules in the processor.

In the embodiments of this application, the memory may be a nonvolatile memory, such as a hard disk drive (HDD) or a solid-state drive (SSD), or may be a volatile memory, such as a random access memory (RAM). The memory is any other medium that can be used to carry or store expected program code in an instruction form or a data structure form and that can be accessed by a computer, but is not limited thereto. The memory in the embodiments of this application may alternatively be a circuit or any other apparatus that can implement a storage function, and is configured to store program instructions and/or data.

All or some of the methods in the embodiments of this application may be implemented by using software, hardware, firmware, or any combination thereof. When software is used for implementation, all or some of the embodiments may be implemented in a form of a computer program product. The computer program product includes one or more computer instructions. When the computer program instructions are loaded and executed on a computer, all or some of the procedures or functions according to the embodiments of the present invention are generated. The computer may be a general-purpose computer, a dedicated computer, a computer network, a network device, user equipment, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, an SSD), or the like.

Clearly, a person skilled in the art can make various modifications and variations to this application without departing from the scope of this application. This application is intended to cover these modifications and variations of this application provided that they fall within the scope of protection defined by the claims of this application and their equivalent technologies.

In the embodiments of this application, "at least one" means one or more, and "a plurality of" means two or more. The term "and/or" describes an association relationship between associated objects and indicates that three relationships may exist. For example, A and/or B may indicate the following cases: Only A exists, both A and B exist, and only B exists, where A and B may be singular or plural. The character "/" usually indicates an "or" relationship between the associated objects. "At least one of the following items (pieces)" or a similar expression thereof refers to any combination of these items, including any combination of singular items (pieces) or plural items (pieces). For example, at least one of a, b, or c may represent: a, b, c, a and b, a and c, b and c, or a, b, and c, where a, b, and c may be singular or plural.

What is claimed is:

1. An uplink data transmission method, applied to a terminal device, the method comprising:

receiving configuration information from a network device, wherein the configuration information comprises a sounding reference signal (SRS) resource set, a value of a usage parameter of the SRS resource set is configured as a codebook, the SRS resource set comprises N SRS resources, and N is an integer greater than 0;

receiving downlink control information from the network device;

jointly determining, based on both a spatial rank index (SRI) field and a transmitted precoding matrix indicator (TPMI) field in the downlink control information, M SRS resources used for uplink data transmission, wherein M is an integer greater than or equal to 1 and less than or equal to N, wherein the SRI field alone does not indicate the M SRS resources, wherein jointly determining M equals N is based on a quantity of antenna ports corresponding to a precoding matrix indicated by the TPMI field equaling a sum of quantities of antenna ports of the N SRS resources, and wherein jointly determining M is less than N is based on the quantity of antenna ports corresponding to the precoding matrix indicated by the TPMI field being less than the sum of quantities of antenna ports of the N SRS resources; and sending uplink data by using the M SRS resources.

2. The method according to claim 1, further comprising:

determining that there is no SRI field in the downlink control information, or a length of the SRI field is 0 in response to the quantity of antenna ports of the precoding matrix indicated by the TPMI field being equal to the sum of the quantities of antenna ports of the N SRS resources.

3. The method according to claim 1, wherein determining the M SRS resources by using the SRI field comprises:

determining, based on a value of the SRI field, the M SRS resources used for uplink data transmission in one or more SRS resources whose quantities of antenna ports are equal to the quantity of antenna ports of the precoding matrix indicated by the TPMI field.

4. An uplink data transmission method, applied to a network device, the method comprising:

sending configuration information to a terminal device, wherein the configuration information comprises a sounding reference signal (SRS) resource set, a value of a usage parameter of the SRS resource set is configured as a codebook, the SRS resource set comprises N SRS resources, and N is an integer greater than 0;

sending downlink control information to the terminal device, wherein the downlink control information is configured such that a spatial rank index (SRI) field and a transmitted precoding matrix indicator (TPMI) field in the downlink control information are jointly interpreted by the terminal device to determine both (i) a number M and (ii) identities of SRS resources used for uplink data transmission, wherein the SRI field alone does not indicate the number M of SRS resources, wherein M is an integer greater than or equal to 1 and less than or equal to N, wherein M is equal to N based on a quantity of antenna ports of a precoding matrix indicated by the TPMI field equaling a sum of quantities of antenna ports of the N SRS resources, and wherein M is less than N based on the quantity of antenna ports of the precoding matrix indicated by the TPMI field being less than the sum of quantities of antenna ports of the N SRS resources; and receiving uplink data sent by the terminal device by way of multiple beams corresponding to the M SRS resources.

5. The method according to claim 4, wherein in response to the quantity of antenna ports of the precoding matrix indicated by the TPMI field being equal to the sum of the quantities of antenna ports of the N SRS resources, there is no SRI field in the downlink control information, or a length of the SRI field is 0.

6. An uplink data transmission method, applied to a terminal device, the method comprising:

receiving configuration information from a network device, wherein the configuration information comprises a sounding reference signal (SRS) resource set, a value of a usage parameter of the SRS resource set is configured as a codebook, the SRS resource set comprises N SRS resources, and N is an integer greater than 0;

receiving downlink control information (DCI) from the network device, wherein the DCI includes a spatial rank index (SRI) field and a transmitted precoding matrix indicator (TPMI) field; and in response to the configuration information meets a first condition, sending uplink data by using M of the N SRS resources, wherein selection of the M SRS resources is based on joint interpretation of the SRI field and the TPMI field in the DCI, wherein M is an integer greater than or equal to 1 and less than or equal to N, wherein the SRI field alone does not indicate the value of M, wherein M equals N based on a quantity of antenna ports corresponding to a precoding matrix indicated by the TPMI field in the DCI equaling a sum of quantities of antenna ports of the N SRS resources, and wherein M is less than N based on the quantity of antenna ports corresponding to the precoding matrix indicated by the TPMI field being less than the sum of quantities of antenna ports of the N SRS resources.

7. The method according to claim 6, wherein the first condition comprises, in the N SRS resources, time domain resources of all the SRS resources overlap with each other.

8. An uplink data transmission method, applied to a terminal device, the method comprising:

receiving, by the terminal device, configuration information from a network device, wherein the configuration information comprises a sounding reference signal (SRS) resource set, wherein a value of a usage parameter of the SRS resource set is configured as non-codebook, wherein the SRS resource set comprises N SRS resources, wherein the SRS resource set is associated with one or more channel state information reference signal (CSI-RS) resources, and wherein N is an integer greater than 0;

receiving downlink control information from the network device, wherein the downlink control information includes a spatial rank index (SRI) field and a transmitted precoding matrix indicator (TPMI) field;

jointly determining, by the terminal device, M SRS resources from the N SRS resources by using the SRI field and the TPMI field, wherein the SRI field alone does not indicate the M SRS resources, wherein M is an integer greater than or equal to 1 and less than or equal to N, wherein M equals N based on a quantity of antenna ports corresponding to a precoding matrix indicated by the TPMI field equaling a sum of quantities of antenna ports of the N SRS resources, and wherein M is less than N based on the quantity of antenna ports corresponding to the precoding matrix indicated by the TPMI field being less than the sum of quantities of antenna ports of the N SRS resources; and determining, by the terminal device, a spatial reception parameter for reception of the one or more CSI-RS resources based on spatial relation information configured for the M SRS resources, wherein the spatial reception parameter comprises at least one of a receive beam, a receive spatial filter, or a quasi-co-location (QCL) parameter associated with the one or more CSI-RS resources.

9. The method according to claim 8, wherein determining the spatial reception parameter of the one or more CSI-RS resources based on the spatial relation information of the N SRS resources comprises:

using all different spatial relation information in the spatial relation information associated with the N SRS resources as the spatial reception parameter of the one or more CSI-RS resources.

10. The method according to claim 8, wherein the spatial reception parameter of the one or more CSI-RS resources is determined based on the spatial relation information of the N SRS resources in response to one or more of the following conditions being met:

a transmission configuration indication state is not configured in the CSI-RS resource;

a transmission configuration indication state configured in the CSI-RS resource does not comprise information whose type is a type D;

spatial relation information is configured for at least one of the N SRS resources;

spatial relation information is configured for each of the N SRS resources;

the spatial relation information associated with the N SRS resources is the same;

the spatial relation information associated with the N SRS resources is not exactly the same;

the spatial relation information associated with the N SRS resources is completely different; or a value of a first field in the SRS resource set is configured as a preset value.

11. The method according to claim 10, wherein the first field is used to indicate whether the spatial reception parameter of the one or more CSI-RS resources is determined by using the spatial relation information of the N SRS resources.

12. The method according to claim 8, wherein determining the spatial reception parameter of the one or more CSI-RS resources based on the spatial relation information of the N SRS resources comprises:

using spatial relation information of an SRS resource having a smallest or largest resource index in the N SRS resources as the spatial reception parameter of the one or more CSI-RS resources.

13. The method according to claim 8, wherein determining the spatial reception parameter of the one or more CSI-RS resources based on the spatial relation information of the N SRS resources comprises:

using spatial relation information of an SRS resource having a smallest or largest resource index in one or more SRS resources for which spatial relation information is configured in the N SRS resources as the spatial reception parameter of the one or more CSI-RS resources.

14. The method according to claim 6, wherein the first condition comprises, in the N SRS resources, time domain resources of at least two SRS resources overlap with each other.

15. The method according to claim 6, wherein the first condition comprises, in the N SRS resources, reference signal resources in spatial relation information parameters of all the SRS resources are different.

16. The method according to claim 6, wherein the first condition comprises, in the N SRS resources, reference signal resources in spatial relation information parameters of at least two SRS resources are different.

17. The method according to claim 6, wherein the first condition comprises, a value of N is greater than a preset value.

* * * * *